United States Patent
Tsai et al.

(10) Patent No.: US 12,064,313 B2
(45) Date of Patent: Aug. 20, 2024

(54) ORTHODONTIC APPLIANCE WITH BITE STRUCTURES AND METHODS OF MAKING SAME

(71) Applicant: Ormco Corporation, Orange, CA (US)

(72) Inventors: Evan Yifeng Tsai, Rancho Cucamonga, CA (US); Karol Miranda, Heredia (CR)

(73) Assignee: Ormco Corporation, Brea, CA (US)

( * ) Notice: Subject to any disclaimer, the term of this patent is extended or adjusted under 35 U.S.C. 154(b) by 173 days.

(21) Appl. No.: 17/176,565

(22) Filed: Feb. 16, 2021

(65) Prior Publication Data

US 2022/0257344 A1    Aug. 18, 2022

(51) Int. Cl.
  *A61C 7/08* (2006.01)
  *A61C 7/00* (2006.01)
  (Continued)

(52) U.S. Cl.
  CPC ............... *A61C 7/08* (2013.01); *A61C 7/002* (2013.01); *B29C 51/30* (2013.01); *B29C 51/46* (2013.01); *B29L 2031/753* (2013.01)

(58) Field of Classification Search
  CPC .. A61C 7/08; A61C 7/002; A61C 7/36; A61C 7/00
  See application file for complete search history.

(56) References Cited

U.S. PATENT DOCUMENTS 5,299,936 A * 4/1994 Ueno .................. A61C 7/08
  433/34

5,683,244 A    11/1997 Truax
(Continued)

FOREIGN PATENT DOCUMENTS

CN    110974455 A    4/2020
CN    111227963 A    6/2020
(Continued)

OTHER PUBLICATIONS

European Patent Office, Partial Search Report issued in EP 22154644.3 dated Jul. 8, 2022.
(Continued)

*Primary Examiner* — Heidi M Eide
*Assistant Examiner* — Lina Faraj
(74) *Attorney, Agent, or Firm* — Wood Herron & Evans LLP

(57) ABSTRACT

An orthodontic aligner includes a shell defining at least one cavity sized to receive one of a patient's teeth. The cavity includes a lingual portion, a labial portion, and an occlusal portion. A bite structure forms at least a portion of the occlusal portion and is configured to be spaced apart from an occlusal surface of the patient's tooth by a distant sufficient to interfere with full closure of the patient's jaws. The bite structure has a non-planar surface that does not conform to the patient's tooth. The non-planar surface includes at least two spaced-apart projections separated by a boundary. The spaced-apart projections are spherical-like projections or ellipsoidal-like projections. The boundary has a grid-like appearance that spans the bite structure side to side. The spaced-apart projections define a tooth-engaging plane of the bite structure. The bite structure is an integral portion of the shell.

18 Claims, 26 Drawing Sheets

(51) Int. Cl.
*B29C 51/30* (2006.01)
*B29C 51/46* (2006.01)
*B29L 31/00* (2006.01)

(56) References Cited

U.S. PATENT DOCUMENTS

| | | | |
|---|---|---|---|
| 5,947,724 A * | 9/1999 | Frantz | A61F 5/566 |
| | | | 128/848 |
| 6,505,625 B1 * | 1/2003 | Uenishi | A61C 7/08 |
| | | | 128/859 |
| 8,113,206 B2 * | 2/2012 | Roettger | A61F 5/566 |
| | | | 128/857 |
| 8,567,408 B2 * | 10/2013 | Roettger | A61C 5/90 |
| | | | 128/861 |
| 8,986,003 B2 | 3/2015 | Valoir | |
| 9,161,823 B2 | 10/2015 | Morton et al. | |
| 9,844,424 B2 | 12/2017 | Wu et al. | |
| 9,861,454 B2 * | 1/2018 | Heine | A61C 7/36 |
| 10,213,277 B2 | 2/2019 | Webber et al. | |
| 10,299,894 B2 | 5/2019 | Tanugula et al. | |
| 10,307,222 B2 | 6/2019 | Morton et al. | |
| 10,363,116 B2 | 7/2019 | Boronkay | |
| 10,537,406 B2 | 1/2020 | Wu et al. | |
| 10,743,964 B2 | 8/2020 | Wu et al. | |
| 2010/0147315 A1 * | 6/2010 | Chodorow | A61F 5/566 |
| | | | 128/861 |
| 2010/0186756 A1 * | 7/2010 | Koizumi | A63B 71/085 |
| | | | 264/16 |
| 2010/0326433 A1 * | 12/2010 | Williams | A61F 5/566 |
| | | | 128/200.24 |
| 2015/0004555 A1 * | 1/2015 | Frey | A61F 5/566 |
| | | | 433/213 |
| 2015/0079531 A1 * | 3/2015 | Heine | A61C 7/08 |
| | | | 433/19 |
| 2015/0366637 A1 | 12/2015 | Kopelman et al. | |
| 2016/0158628 A1 * | 6/2016 | Layzell | A63B 71/08 |
| | | | 264/16 |
| 2016/0361139 A1 | 12/2016 | Webber et al. | |
| 2017/0007359 A1 | 1/2017 | Kopelman et al. | |
| 2017/0007360 A1 | 1/2017 | Kopelman et al. | |
| 2017/0007363 A1 * | 1/2017 | Boronkay | A61C 1/0046 |
| 2017/0209238 A9 | 7/2017 | Tanugula et al. | |
| 2017/0367793 A1 * | 12/2017 | Veis | A61C 7/36 |
| 2018/0000564 A1 | 1/2018 | Cam et al. | |
| 2018/0078342 A1 | 3/2018 | Gardner | |
| 2018/0132975 A1 | 5/2018 | Wu et al. | |
| 2018/0153733 A1 * | 6/2018 | Kuo | A61F 5/58 |
| 2018/0338819 A1 * | 11/2018 | Chou | A61C 7/08 |
| 2019/0029775 A1 | 1/2019 | Morton et al. | |
| 2019/0046294 A1 | 2/2019 | Hung | |
| 2019/0053877 A1 * | 2/2019 | Hung | A61C 7/08 |
| 2019/0090983 A1 | 3/2019 | Webber et al. | |
| 2019/0125494 A1 | 5/2019 | Li et al. | |
| 2019/0175304 A1 | 6/2019 | Morton et al. | |
| 2019/0282337 A1 | 9/2019 | Tanugula et al. | |
| 2019/0282338 A1 | 9/2019 | Tanugula et al. | |
| 2019/0290399 A1 | 9/2019 | Boronkay | |
| 2019/0314117 A1 | 10/2019 | Morton et al. | |
| 2020/0000557 A1 | 1/2020 | Tanugula et al. | |
| 2020/0100873 A1 | 4/2020 | Tanugula et al. | |
| 2020/0146778 A1 | 5/2020 | Wu et al. | |
| 2020/0345457 A1 | 11/2020 | Wu et al. | |
| 2021/0169618 A1 * | 6/2021 | Nishimuta | A61C 7/08 |
| 2022/0008244 A1 * | 1/2022 | Hart | A61F 5/566 |
| 2022/0031426 A1 * | 2/2022 | Sato | B33Y 50/00 |
| 2022/0168070 A1 * | 6/2022 | Ito | B33Y 10/00 |
| 2022/0346911 A1 * | 11/2022 | Fung | A61C 7/002 |

FOREIGN PATENT DOCUMENTS

| | | | |
|---|---|---|---|
| CN | 211300419 U | 8/2020 | |
| CN | 211300422 U | 8/2020 | |
| CN | 211460606 U | 9/2020 | |
| KR | 1676205 B1 * | 11/2016 | A61B 34/10 |
| KR | 101676205 B1 | 11/2016 | |
| KR | 20230151790 A * | 11/2023 | |
| WO | WO-2016042393 A1 * | 3/2016 | A61C 7/002 |
| WO | WO-2017093864 A1 * | 6/2017 | A61C 7/002 |
| WO | WO-2019089773 A1 * | 5/2019 | A61C 7/002 |

OTHER PUBLICATIONS

European Patent Office, Extended Search Report issued in EP 22154644.3 dated Oct. 12, 2022.
EPO Review Remarks No. EPP173 App No. 22 154 6443 3 dated Jan. 23, 2024.

* cited by examiner

| Compression Testing - Material: MP100 | | | | | | | | | |
|---|---|---|---|---|---|---|---|---|---|
| Sample # | 1st $H_o$ | 2nd $H_o$ | 3rd $H_o$ | 1st $H_f$ | 2nd $H_f$ | 3rd $H_f$ | Average $H_o$ | Average $H_f$ | $\Delta H$ (mm) |
| Sample 1 - Molar 1 | 8.37 | 8.36 | 8.34 | 8.34 | 8.32 | 8.33 | 8.36 | 8.33 | 0.03 |
| Sample 1 - Molar 2 | 7.29 | 7.30 | 7.27 | 7.24 | 7.27 | 7.28 | 7.29 | 7.26 | 0.02 |
| Sample 1 - Molar 3 | 8.01 | 7.98 | 8.00 | 8.01 | 7.99 | 7.97 | 8.00 | 7.99 | 0.01 |
| Sample 1 - Molar 4 | 6.88 | 6.82 | 6.53 | 6.56 | 6.71 | 6.77 | 6.74 | 6.68 | 0.06 |
| Sample 2 - Molar 1 | 8.30 | 8.29 | 8.30 | 8.28 | 8.29 | 8.29 | 8.30 | 8.29 | 0.01 |
| Sample 2 - Molar 2 | 7.26 | 7.36 | 7.33 | 7.34 | 7.32 | 7.29 | 7.32 | 7.32 | 0.00 |
| Sample 2 - Molar 3 | 8.11 | 8.12 | 8.09 | 8.05 | 8.08 | 8.08 | 8.11 | 8.07 | 0.04 |
| Sample 2 - Molar 4 | 6.72 | 6.62 | 6.70 | 6.64 | 6.70 | 6.48 | 6.68 | 6.61 | 0.07 |
| Sample 3 - Molar 1 | 8.39 | 8.30 | 8.30 | 8.29 | 8.30 | 8.28 | 8.33 | 8.29 | 0.04 |
| Sample 3 - Molar 2 | 7.41 | 7.38 | 7.32 | 7.41 | 7.30 | 7.34 | 7.37 | 7.35 | 0.02 |
| Sample 3 - Molar 3 | 7.97 | 7.95 | 7.99 | 7.77 | 7.76 | 7.76 | 7.97 | 7.76 | 0.21 |
| Sample 3 - Molar 4 | 6.84 | 6.81 | 6.75 | 6.76 | 6.83 | 6.78 | 6.80 | 6.79 | 0.01 |
| Sample 4 - Molar 1 | 8.34 | 8.32 | 8.34 | 8.34 | 8.33 | 8.33 | 8.33 | 8.33 | 0.00 |
| Sample 4 - Molar 2 | 7.30 | 7.32 | 7.25 | 7.27 | 7.31 | 7.28 | 7.29 | 7.29 | 0.00 |
| Sample 4 - Molar 3 | 7.97 | 7.95 | 7.99 | 7.77 | 7.76 | 7.76 | 7.97 | 7.76 | 0.21 |
| Sample 4 - Molar 4 | 6.96 | 7.00 | 6.79 | 6.69 | 6.74 | 6.88 | 6.92 | 6.77 | 0.15 |
| Sample 5 - Molar 1 | 8.27 | 8.25 | 8.29 | 8.25 | 8.26 | 8.26 | 8.27 | 8.26 | 0.01 |
| Sample 5 - Molar 2 | 7.34 | 7.46 | 7.44 | 7.38 | 7.32 | 7.35 | 7.41 | 7.35 | 0.06 |
| Sample 5 - Molar 3 | 7.97 | 8.00 | 8.01 | 7.99 | 8.00 | 7.97 | 7.99 | 7.99 | 0.01 |
| Sample 5 - Molar 4 | 6.56 | 6.52 | 6.61 | 6.60 | 6.56 | 6.53 | 6.56 | 6.56 | 0.00 |
| Sample 6 - Molar 1 | 8.32 | 8.32 | 8.29 | 8.31 | 8.30 | 8.31 | 8.31 | 8.31 | 0.00 |
| Sample 6 - Molar 2 | 7.16 | 7.19 | 7.21 | 7.14 | 7.17 | 7.19 | 7.19 | 7.17 | 0.02 |
| Sample 6 - Molar 3 | 8.08 | 8.07 | 8.04 | 8.01 | 8.00 | 7.98 | 8.06 | 8.00 | 0.07 |
| Sample 6 - Molar 4 | 6.70 | 6.66 | 6.65 | 6.65 | 6.69 | 6.64 | 6.67 | 6.66 | 0.01 |
| Sample 7 - Molar 1 | 8.37 | 8.40 | 8.41 | 8.36 | 8.37 | 8.40 | 8.39 | 8.38 | 0.02 |
| Sample 7 - Molar 2 | 7.02 | 6.97 | 6.92 | 6.87 | 6.88 | 6.95 | 6.97 | 6.90 | 0.07 |
| Sample 7 - Molar 3 | 7.88 | 7.92 | 7.84 | 7.91 | 7.85 | 7.88 | 7.88 | 7.88 | 0.00 |
| Sample 7 - Molar 4 | 6.82 | 6.85 | 6.83 | 6.78 | 6.76 | 6.84 | 6.83 | 6.79 | 0.04 |
| Sample 8 - Molar 1 | 8.39 | 8.41 | 8.40 | 8.40 | 8.38 | 8.37 | 8.40 | 8.38 | 0.02 |
| Sample 8 - Molar 2 | 7.36 | 7.41 | 7.33 | 7.36 | 7.30 | 7.34 | 7.37 | 7.33 | 0.03 |
| Sample 8 - Molar 3 | 8.13 | 8.11 | 8.10 | 8.09 | 8.06 | 8.08 | 8.11 | 8.08 | 0.04 |
| Sample 8 - Molar 4 | 6.78 | 6.65 | 6.62 | 6.72 | 6.68 | 6.60 | 6.68 | 6.67 | 0.02 |
| Sample 9 - Molar 1 | 8.42 | 8.39 | 8.44 | 8.34 | 8.39 | 8.39 | 8.42 | 8.37 | 0.04 |
| Sample 9 - Molar 2 | 7.35 | 7.39 | 7.42 | 7.34 | 7.32 | 7.35 | 7.39 | 7.34 | 0.05 |
| Sample 9 - Molar 3 | 7.97 | 7.95 | 7.95 | 7.95 | 7.93 | 7.94 | 7.96 | 7.94 | 0.02 |
| Sample 9 - Molar 4 | 6.52 | 6.58 | 6.55 | 6.53 | 6.55 | 6.52 | 6.55 | 6.53 | 0.02 |

FIG. 20A

| Compression Testing - Material: Zendura XL ||||||||||
|---|---|---|---|---|---|---|---|---|---|
| Sample # | 1st $H_o$ | 2nd $H_o$ | 3rd $H_o$ | 1st $H_f$ | 2nd $H_f$ | 3rd $H_f$ | Average $H_o$ | Average $H_f$ | $\Delta H$ (mm) |
| Sample 1 - Molar 1 | 8.10 | 8.15 | 8.20 | 8.30 | 8.25 | 8.26 | 8.15 | 8.27 | 0.12 |
| Sample 1 - Molar 2 | 7.35 | 7.41 | 7.50 | 7.41 | 7.39 | 7.40 | 7.42 | 7.40 | 0.02 |
| Sample 1 - Molar 3 | 8.21 | 8.20 | 8.23 | 8.12 | 8.11 | 8.14 | 8.21 | 8.12 | 0.09 |
| Sample 1 - Molar 4 | 6.81 | 6.84 | 7.06 | 6.65 | 6.73 | 6.68 | 6.90 | 6.69 | 0.22 |
| Sample 2 - Molar 1 | 8.50 | 8.46 | 8.46 | 8.48 | 8.47 | 8.43 | 8.47 | 8.46 | 0.01 |
| Sample 2 - Molar 2 | 7.41 | 7.45 | 7.49 | 7.46 | 7.45 | 7.44 | 7.45 | 7.45 | 0.00 |
| Sample 2 - Molar 3 | 8.20 | 8.16 | 8.21 | 8.16 | 8.15 | 8.17 | 8.19 | 8.16 | 0.03 |
| Sample 2 - Molar 4 | 6.69 | 6.72 | 6.92 | 6.71 | 6.82 | 6.78 | 6.78 | 6.77 | 0.01 |
| Sample 3 - Molar 1 | 8.22 | 8.20 | 8.21 | 8.19 | 8.17 | 8.14 | 8.21 | 8.17 | 0.04 |
| Sample 3 - Molar 2 | 7.58 | 7.61 | 7.52 | 7.57 | 7.59 | 7.60 | 7.57 | 7.59 | 0.02 |
| Sample 3 - Molar 3 | 8.16 | 8.17 | 8.18 | 8.12 | 8.14 | 8.13 | 8.17 | 8.13 | 0.04 |
| Sample 3 - Molar 4 | 6.86 | 6.89 | 6.90 | 6.89 | 6.84 | 6.82 | 6.88 | 6.85 | 0.03 |
| Sample 4 - Molar 1 | 8.02 | 8.06 | 8.08 | 8.02 | 8.01 | 8.00 | 8.05 | 8.01 | 0.04 |
| Sample 4 - Molar 2 | 7.26 | 7.13 | 7.34 | 7.33 | 7.29 | 7.28 | 7.24 | 7.30 | 0.06 |
| Sample 4 - Molar 3 | 8.10 | 8.11 | 8.14 | 8.04 | 8.09 | 8.06 | 8.12 | 8.06 | 0.05 |
| Sample 4 - Molar 4 | 6.72 | 6.83 | 6.77 | 6.69 | 6.75 | 6.76 | 6.77 | 6.73 | 0.04 |
| Sample 5 - Molar 1 | 8.32 | 8.28 | 8.33 | 8.23 | 8.24 | 8.21 | 8.31 | 8.23 | 0.08 |
| Sample 5 - Molar 2 | 7.42 | 7.36 | 7.31 | 7.32 | 7.28 | 7.30 | 7.36 | 7.30 | 0.06 |
| Sample 5 - Molar 3 | 8.27 | 8.21 | 8.27 | 8.11 | 8.08 | 8.15 | 8.25 | 8.11 | 0.14 |
| Sample 5 - Molar 4 | 6.88 | 6.90 | 6.92 | 6.81 | 6.80 | 6.75 | 6.90 | 6.79 | 0.11 |
| Sample 6 - Molar 1 | 8.49 | 8.29 | 8.31 | 8.47 | 8.46 | 8.48 | 8.36 | 8.47 | 0.11 |
| Sample 6 - Molar 2 | 7.41 | 7.58 | 7.57 | 7.61 | 7.59 | 7.61 | 7.52 | 7.60 | 0.08 |
| Sample 6 - Molar 3 | 8.25 | 8.26 | 8.25 | 8.16 | 8.14 | 8.12 | 8.25 | 8.14 | 0.11 |
| Sample 6 - Molar 4 | 6.74 | 6.72 | 6.77 | 6.77 | 6.73 | 6.76 | 6.74 | 6.75 | 0.01 |
| Sample 7 - Molar 1 | 8.38 | 8.40 | 8.44 | 8.39 | 8.37 | 8.39 | 8.41 | 8.38 | 0.02 |
| Sample 7 - Molar 2 | 7.42 | 7.39 | 7.33 | 7.39 | 7.40 | 7.34 | 7.38 | 7.38 | 0.00 |
| Sample 7 - Molar 3 | 8.15 | 8.19 | 8.14 | 8.13 | 8.14 | 8.11 | 8.16 | 8.13 | 0.03 |
| Sample 7 - Molar 4 | 6.91 | 6.94 | 6.83 | 6.79 | 6.86 | 6.79 | 6.89 | 6.81 | 0.08 |
| Sample 8 - Molar 1 | 8.44 | 8.45 | 8.42 | 8.40 | 8.41 | 8.40 | 8.44 | 8.40 | 0.03 |
| Sample 8 - Molar 2 | 7.66 | 7.63 | 7.65 | 7.51 | 7.47 | 7.43 | 7.65 | 7.47 | 0.18 |
| Sample 8 - Molar 3 | 7.97 | 7.98 | 7.92 | 7.96 | 7.94 | 7.95 | 7.96 | 7.95 | 0.01 |
| Sample 8 - Molar 4 | 6.88 | 6.87 | 6.91 | 6.87 | 6.86 | 6.85 | 6.89 | 6.86 | 0.03 |
| Sample 9 - Molar 1 | 8.16 | 8.14 | 8.13 | 8.16 | 8.13 | 8.15 | 8.14 | 8.15 | 0.00 |
| Sample 9 - Molar 2 | 7.43 | 7.46 | 7.46 | 7.51 | 7.47 | 7.43 | 7.45 | 7.47 | 0.02 |
| Sample 9 - Molar 3 | 8.14 | 8.12 | 8.13 | 8.12 | 8.10 | 8.13 | 8.13 | 8.12 | 0.01 |
| Sample 9 - Molar 4 | 6.98 | 7.01 | 7.00 | 7.00 | 6.93 | 6.99 | 7.00 | 6.97 | 0.02 |

FIG. 20B

| Deformation Ratio, % - PBT Grinding Test 1 (MP100) | | | | | |
|---|---|---|---|---|---|
| Sample # | Average $H_o$ | Average $H_f$ | Average $L_o$ | Average $L_f$ | Deformation, % |
| Sample 1 - Molar 1 (L1) | 34.60 | 34.58 | 60.55 | 60.12 | 0.64 |
| Sample 1 - Molar 2 (L2) | 42.88 | 42.89 | 52.81 | 52.65 | 0.33 |
| Sample 1 - Molar 3 (R1) | 34.60 | 34.51 | 60.55 | 60.00 | 0.67 |
| Sample 1 - Molar 4 (R2) | 42.88 | 42.70 | 52.81 | 52.64 | 0.08 |
| Sample 2 - Molar 1 (L1) | 34.71 | 34.50 | 59.93 | 59.84 | 0.44 |
| Sample 2 - Molar 2 (L2) | 42.60 | 42.47 | 52.76 | 52.73 | 0.24 |
| Sample 2 - Molar 3 (R1) | 34.71 | 34.22 | 59.93 | 59.84 | 1.25 |
| Sample 2 - Molar 4 (R2) | 42.60 | 42.89 | 52.76 | 52.61 | 0.97 |
| Sample 3 - Molar 1 (L1) | 34.66 | 34.67 | 59.71 | 59.42 | 0.50 |
| Sample 3 - Molar 2 (L2) | 42.92 | 42.77 | 52.56 | 52.52 | 0.26 |
| Sample 3 - Molar 3 (R1) | 34.66 | 34.66 | 59.71 | 59.51 | 0.34 |
| Sample 3 - Molar 4 (R2) | 42.92 | 42.89 | 52.56 | 52.48 | 0.09 |
| Sample 4 - Molar 1 (L1) | 34.99 | 34.85 | 59.71 | 59.65 | 0.28 |
| Sample 4 - Molar 2 (L2) | 42.92 | 42.73 | 52.95 | 52.83 | 0.20 |
| Sample 4 - Molar 3 (R1) | 34.99 | 34.69 | 59.71 | 59.61 | 0.68 |
| Sample 4 - Molar 4 (R2) | 42.92 | 42.54 | 52.95 | 52.73 | 0.48 |
| Sample 5 - Molar 1 (L1) | 34.94 | 34.85 | 59.98 | 59.66 | 0.27 |
| Sample 5 - Molar 2 (L2) | 42.87 | 42.51 | 52.73 | 52.56 | 0.52 |
| Sample 5 - Molar 3 (R1) | 34.94 | 34.62 | 59.98 | 59.47 | 0.09 |
| Sample 5 - Molar 4 (R2) | 42.87 | 42.60 | 52.73 | 52.58 | 0.33 |
| Sample 6 - Molar 1 (L1) | 34.77 | 34.67 | 59.98 | 59.95 | 0.23 |
| Sample 6 - Molar 2 (L2) | 42.86 | 42.61 | 52.92 | 52.86 | 0.47 |
| Sample 6 - Molar 3 (R1) | 34.77 | 34.69 | 59.98 | 59.83 | 0.04 |
| Sample 6 - Molar 4 (R2) | 42.86 | 42.59 | 52.92 | 52.89 | 0.57 |
| Sample 7 - Molar 1 (L1) | 34.41 | 34.33 | 60.55 | 60.10 | 0.52 |
| Sample 7 - Molar 2 (L2) | 42.80 | 42.63 | 53.33 | 53.22 | 0.19 |
| Sample 7 - Molar 3 (R1) | 34.41 | 34.30 | 60.55 | 59.95 | 0.67 |
| Sample 7 - Molar 4 (R2) | 42.80 | 42.77 | 53.33 | 53.15 | 0.29 |
| Sample 8 - Molar 1 (L1) | 34.43 | 34.39 | 61.02 | 60.52 | 0.71 |
| Sample 8 - Molar 2 (L2) | 42.70 | 42.55 | 53.51 | 53.51 | 0.35 |
| Sample 8 - Molar 3 (R1) | 34.43 | 34.37 | 61.02 | 60.54 | 0.63 |
| Sample 8 - Molar 4 (R2) | 42.70 | 42.46 | 53.51 | 53.44 | 0.42 |
| Sample 9 - Molar 1 (L1) | 34.57 | 34.40 | 59.62 | 59.56 | 0.38 |
| Sample 9 - Molar 2 (L2) | 43.47 | 43.51 | 52.83 | 52.07 | 1.54 |
| Sample 9 - Molar 3 (R1) | 34.57 | 34.34 | 59.62 | 59.48 | 0.43 |
| Sample 9 - Molar 4 (R2) | 43.47 | 43.48 | 52.83 | 52.68 | 0.31 |

FIG. 21A

| Deformation Ratio, % - PBT Grinding Test 1 (Zendura XL) | | | | | |
|---|---|---|---|---|---|
| Sample # | Average $H_o$ | Average $H_f$ | Average $L_o$ | Average $L_f$ | Deformation, % |
| Sample 1 - Molar 1 (L1) | 35.23 | 35.08 | 52.03 | 51.82 | 0.01 |
| Sample 1 - Molar 2 (L2) | 43.67 | 43.58 | 59.73 | 59.77 | 0.28 |
| Sample 1 - Molar 3 (R1) | 35.23 | 35.08 | 52.03 | 51.97 | 0.32 |
| Sample 1 - Molar 4 (R2) | 43.67 | 43.41 | 59.69 | 59.41 | 0.12 |
| Sample 2 - Molar 1 (L1) | 34.83 | 34.75 | 51.52 | 51.42 | 0.06 |
| Sample 2 - Molar 2 (L2) | 43.65 | 43.61 | 57.69 | 57.80 | 0.29 |
| Sample 2 - Molar 3 (R1) | 34.83 | 34.84 | 51.52 | 51.36 | 0.32 |
| Sample 2 - Molar 4 (R2) | 43.65 | 43.63 | 57.69 | 57.65 | 0.03 |
| Sample 3 - Molar 1 (L1) | 34.61 | 34.63 | 51.63 | 51.58 | 0.14 |
| Sample 3 - Molar 2 (L2) | 44.06 | 43.95 | 58.87 | 58.82 | 0.15 |
| Sample 3 - Molar 3 (R1) | 34.61 | 34.59 | 51.63 | 51.47 | 0.23 |
| Sample 3 - Molar 4 (R2) | 44.06 | 43.81 | 58.87 | 58.82 | 0.48 |
| Sample 4 - Molar 1 (L1) | 34.02 | 34.40 | 51.66 | 51.54 | 1.32 |
| Sample 4 - Molar 2 (L2) | 43.51 | 43.61 | 58.99 | 58.78 | 0.59 |
| Sample 4 - Molar 3 (R1) | 34.02 | 34.31 | 51.66 | 51.64 | 0.87 |
| Sample 4 - Molar 4 (R2) | 43.51 | 43.60 | 58.99 | 58.94 | 0.29 |
| Sample 5 - Molar 1 (L1) | 35.27 | 34.85 | 51.79 | 51.63 | 0.91 |
| Sample 5 - Molar 2 (L2) | 44.09 | 43.91 | 59.85 | 59.70 | 0.16 |
| Sample 5 - Molar 3 (R1) | 35.27 | 35.03 | 51.79 | 51.67 | 0.46 |
| Sample 5 - Molar 4 (R2) | 44.07 | 44.58 | 59.85 | 59.69 | 1.41 |
| Sample 6 - Molar 1 (L1) | 34.84 | 34.72 | 51.48 | 51.46 | 0.33 |
| Sample 6 - Molar 2 (L2) | 43.93 | 43.67 | 58.78 | 58.46 | 0.07 |
| Sample 6 - Molar 3 (R1) | 34.84 | 34.86 | 51.48 | 51.43 | 0.14 |
| Sample 6 - Molar 4 (R2) | 43.93 | 43.72 | 58.78 | 58.38 | 0.19 |
| Sample 7 - Molar 1 (L1) | 34.93 | 34.92 | 51.39 | 51.35 | 0.07 |
| Sample 7 - Molar 2 (L2) | 44.55 | 44.59 | 57.69 | 57.59 | 0.27 |
| Sample 7 - Molar 3 (R1) | 34.93 | 34.62 | 51.39 | 51.36 | 0.83 |
| Sample 7 - Molar 4 (R2) | 44.55 | 44.41 | 57.69 | 57.59 | 0.13 |
| Sample 8 - Molar 1 (L1) | 34.57 | 34.70 | 52.13 | 52.07 | 0.49 |
| Sample 8 - Molar 2 (L2) | 43.86 | 43.80 | 59.87 | 59.43 | 0.59 |
| Sample 8 - Molar 3 (R1) | N.A | N.A | N.A | N.A | --- |
| Sample 8 - Molar 4 (R2) | 43.86 | 43.86 | 59.87 | 59.19 | 1.14 |
| Sample 9 - Molar 1 (L1) | 34.67 | 34.61 | 51.74 | 51.65 | 0.01 |
| Sample 9 - Molar 2 (L2) | 44.23 | 44.12 | 58.91 | 58.84 | 0.14 |
| Sample 9 - Molar 3 (R1) | 34.67 | 34.62 | 51.74 | 51.68 | 0.03 |
| Sample 9 - Molar 4 (R2) | 44.23 | 44.03 | 58.91 | 58.84 | 0.34 |

FIG. 21B

ORTHODONTIC APPLIANCE WITH BITE STRUCTURES AND METHODS OF MAKING SAME

TECHNICAL FIELD

The present invention relates generally to orthodontic appliances for orthodontic treatment and, more particularly, to orthodontic appliances having a bite structures and methods of making orthodontic appliances having those structures thereon.

BACKGROUND

Orthodontics is the practice of manipulating teeth to correct malocclusions between the teeth of the upper and lower dental arches. Typically, treatment of malocclusions includes the use of an orthodontic appliance that applies corrective forces to the teeth. Over time, these corrective forces coerce the teeth to move into their orthodontically correct positions.

One way of applying corrective forces is with orthodontic appliances referred to as "dental aligners," or simply "aligners." Aligners are supplied as a series of removable appliances that incrementally reposition the patient's teeth from their initial orientation to their orthodontically correct orientation. Patients being treated with aligners can insert and remove the aligners at will. When one aligner has moved the teeth to at or near a final orientation for that aligner, the patient merely begins using the next aligner in the series according to a treatment plan, which is prescribed by a clinician.

To fabricate aligners, the clinician first obtains a computer model of the patient's dentition. This model may be generated from data by taking an impression of the dentition and scanning the impression into a computer. Alternatively, the data may be generated by directly scanning the patient's teeth with an intraoral scanner. In either case, the scanned data is then used to construct the computer model of the patient's dentition.

Once the computer model has been obtained, the orthodontist may manipulate individual teeth in the computer model to determine a final orientation of each tooth that provides a corrected dentition. Multiple computer models may then be generated, with each corresponding to an incremental orientation of the dentition from an initial orientation to a target orientation. The incremental orientations from initial to target orientations may be designed to move the patient's teeth according to a treatment plan. Treatment plans typically include numerous stages of movement from an initial orientation to a target orientation. Depending on the degree of tooth movement, treatment plans may include a series of aligners that are worn in a predetermined sequence to move teeth from the initial orientation to the target orientation with the last aligner moving the patient's teeth to the final orientation.

Once the design of the series of aligners is complete, the series of aligners is fabricated. Manufacturing each aligner in the series typically involves forming a plastic sheet onto a mold constructed of a target orientation of the dentition according to the computer models. After forming, waste material must be trimmed away to produce the aligner. Trimming may utilize CNC milling or another computer controlled cutting system.

Certain types of malocclusions may require use of specialized bite modification structures at one or more periods during orthodontic treatment. These structures may be secured to the patient's teeth for a predetermined period of time and then removed. For example, bite turbos are small pads or ramps made of acrylic or metal and are adhesively secured to the patient's teeth. Bite turbos are typically utilized in conjunction with orthodontic brackets, commonly referred to as braces, which unlike aligners, are attached to the patient's teeth. Bite turbos are commonly used in orthodontic treatment where temporary dislodgement of the upper/lower arches is required. Due to their location, a bite turbo may prevent full closure of the patient's teeth. This allows better arch development and more effective elastics usage by eliminating obstacles imposed by interlocking teeth. Conventionally composites are hand-formed while being bonded on the teeth (e.g., molars) to create a bite turbo. This process results in a solid object being adhesively secured to an occlusal surface of a patient's tooth, typically a molar tooth. A bite turbo is not removable by the patient. Bite turbos are also known as bite ramps and bite blocks each of which modifies the patient's bite.

While structures, such as bite turbos, are commonplace for use with orthodontic brackets, these structures are not practical for orthodontic treatment with aligners. For one, clinicians have difficultly accounting for placement and shape of these structures on the patient's tooth during aligner design and manufacturing. Because design and manufacturing occur prior to placement of a bite turbo, the clinician may only resort to guessing at the shape and location of the future bite turbo. As a result, the aligner does not fit the patient's teeth/bite turbo as intended during treatment. In those situations, the affected aligner does not produce the desired tooth movement and orthodontic treatment may not proceed as intended. Moreover, while the patient may remove their aligners to eat, the bite turbo remains in place on the patient's teeth. This disrupts the patient's ability to eat, which can be painful and is at least annoying for the patient. Attaching these structures to the aligner, rather than to the teeth, is also not ideal, since placement is then dependent upon the orthodontist's skills and requires the orthodontist's intervention during treatment, which is inconvenient for the patient.

While successful, there are drawbacks to aligners when treatment requires bite modification, such as with a bite turbo. What is needed in orthodontic treatment is a way of facilitating planned, consistent bite modification during treatment with aligners.

SUMMARY

The present invention overcomes the shortcomings and drawbacks in bite turbos and similar structures for use with aligners heretofore known for use in orthodontic treatment. While the invention will be described in connection with certain embodiments, it will be understood that the invention is not limited to those embodiments. On the contrary, the invention includes all alternatives, modifications and equivalents as may be included within the spirit and scope of the present invention.

In accordance with the principles of the present invention, an orthodontic aligner for orthodontic treatment of a patient comprises a shell defining at least one cavity sized to receive one of the patient's teeth. The cavity includes a lingual portion, a labial portion, and an occlusal portion. A bite structure forms at least a portion of the occlusal portion and is configured to be spaced apart from an occlusal surface of the patient's tooth by a distant sufficient to interfere with full closure of the patient's jaws. The bite structure has a non-planar surface that does not conform to the patient's tooth. The bite structure is configured to be spaced apart from an occlusal surface of the at least one of the patient's teeth by a distant sufficient to interfere with full closure of the patient's jaws.

In one embodiment, the non-planar surface includes at least two spaced-apart projections separated by a boundary.

In one embodiment, the spaced-apart projections are spherical-like projections or ellipsoidal-like projections.

In one embodiment, the boundary has a grid-like appearance that spans the bite structure side to side.

In one embodiment, each spaced-apart projections define a peak, and the peaks collectively define a tooth-engaging surface of the bite structure.

In one embodiment, the tooth-engaging surface is a plane.

In one embodiment, the plane is tilted relative to an occlusal table defined by cusps of the patient's tooth.

In one embodiment, the tooth-engaging surface is concave.

In one embodiment, the bite structure is integral to the shell.

In one embodiment, each of the lingual portion and the labial portion conform to a lingual surface and a labial surface, respectively, of the patient's tooth.

In one embodiment, no material extends between the bite structure and tooth surface to support the spaced-apart projections of the bite structure when the patient wears the aligner.

In one embodiment, at least one of the spaced-apart projections forms a sidewall of the bite structure and the sidewall is positioned to project the bite structure occlusally from a cusp of the patient's tooth.

In one embodiment, the bite structure is supported by and sized to span between cusps on the at least one of the patient's teeth.

In one embodiment, the bite structure is configured to compresses by less than 50% during orthodontic treatment.

According to principles of the present invention there is a series of orthodontic aligners in which at least one aligner includes the bite structure.

According to principles of the present invention there is a method of manufacturing the aligner including manufacturing a mold. The mold having a plurality of projections corresponding to the patient's teeth and a molded structure forming at least a portion of one of the plurality of projections. The molded structure is configured to form the bite structure.

In one embodiment, the method further includes thermoforming a worksheet over the mold to deform the worksheet. Following thermoforming, the deformed worksheet includes the at least one cavity and the bite structure corresponds to the molded structure.

According to principles of the present invention there a mold useable for manufacturing an orthodontic aligner for a patient. The mold includes a plurality of projections corresponding to the patient's teeth. The projections include surfaces corresponding to a lingual surface, a labial surface, and an occlusal surface of a corresponding one of the patient's teeth. And, at least one projection of the plurality of projections includes a molded structure projecting from a surface corresponding to the occlusal surface of the corresponding one of the patient's teeth. The molded structure has a non-planar surface that does not conform to the corresponding one of the patient's teeth.

In one embodiment, the bite structure is integral to the mold.

According to principles of the present invention there a method of making an orthodontic aligner. The method includes identifying a region on an occlusal surface of a 3-D model of a patient's tooth for a virtual bite structure. Filling at least a portion of the region with a plurality of polygons, at least two of the polygons sharing a side and defining at least two nodes. Assigning a first three-dimensional shape having at least one virtual projection to one the at least two nodes, and assigning a second three-dimensional shape having at least one virtual projection to the other of the at least two nodes. The first and second three-dimensional shapes overlapping to form a virtual bite structure including a planar boundary between the respective virtual projections.

In one embodiment, the method further includes manufacturing a mold including a plurality of projections corresponding to the patient's teeth. At least one projection of the plurality of projections includes a molded structure corresponding to the virtual bite structure. The molded structure has a non-planar surface that does not conform to the corresponding one of the patient's teeth.

According to principles of the present invention there is a system for making a virtual bite structure in relation to a virtual model of a patient's teeth. The system includes a processor and a memory including program code. The processor is configured by the program code to fill at least a portion of an identified region on an occlusal surface of a virtual tooth model with a plurality of polygons. At least two of the polygons share a side and define at least two nodes. The processor is further configured to assign a first three-dimensional shape having at least one virtual projection to one of the at least two nodes. And, assign a second three-dimensional shape having at least one virtual projection to the other of the at least two nodes. The first and second three-dimensional shapes overlap to form a virtual bite structure including a planar boundary between the respective virtual projections.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

FIG. 20A includes a table of data and calculations from compression testing of aligners according to embodiments of the invention.

FIG. 20B includes a table of data and calculations from compression testing of aligners according to embodiments of the invention.

FIG. 21A includes a table of data and calculations from durability testing of aligners according to embodiments of the invention.

FIG. 21B includes a table of data and calculations from durability testing of aligners according to embodiments of the invention.

DETAILED DESCRIPTION

According to embodiments of the invention, one or more dental aligners utilized for orthodontic treatment may include an integrated structure that modifies the patient's bite while being worn. That is, the aligner moves the patient's teeth according to a treatment plan while also preventing full closure of the patient's jaws at one or more preselected locations. The treatment benefits of preventing full jaw closure are realized with an aligner according to embodiments of the invention. Advantageously, the bite structure is built-in to the aligner and so is inserted and is removed as the patient inserts and removes the aligner from their mouth. When the patient closes their jaws and upper and lower teeth are brought toward each other, the built-in structure of the aligner is captured between opposing teeth. The built-in structure includes specific features that permit the structure to maintain its shape and strength for the period of use of the aligner and despite repeated jaw compression during that period. In other words, the structure resists collapse under bite compression. The built-in structure is thus effective at consistently and predictably spacing the patient's teeth apart during the entirety of the treatment period for that aligner.

Figure 1:
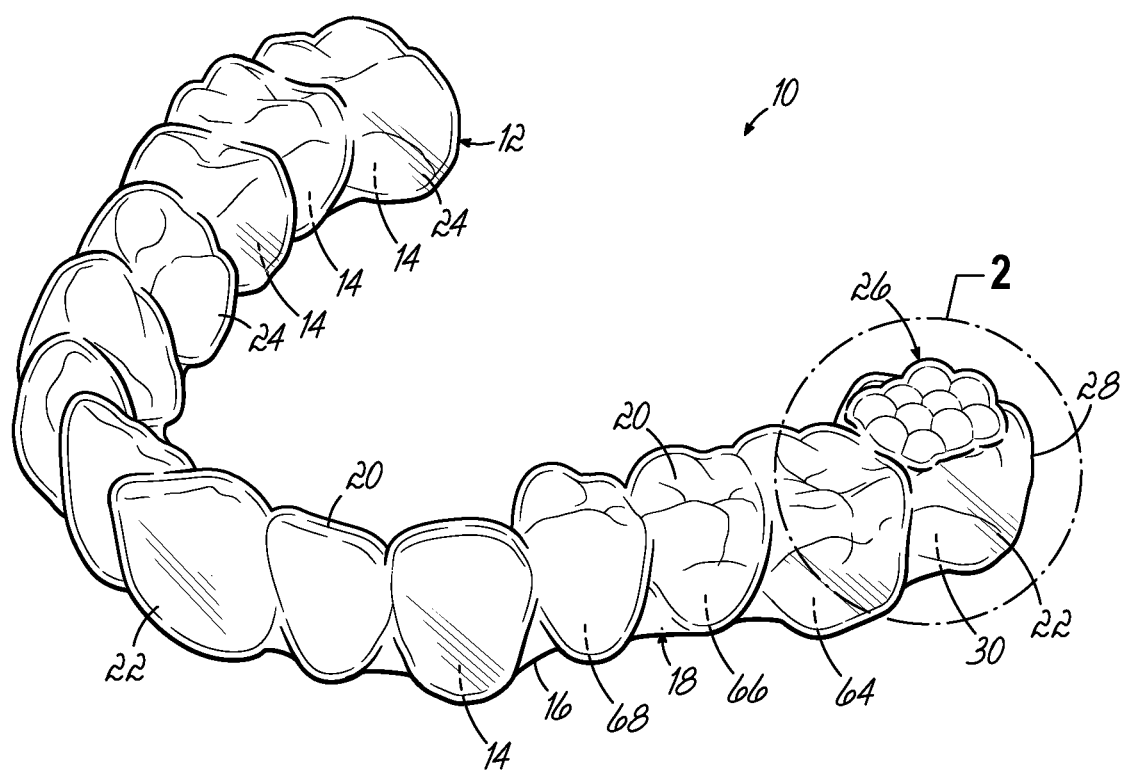
FIG. 1 is a perspective view of an aligner according to one embodiment of the invention.
Figure 2:
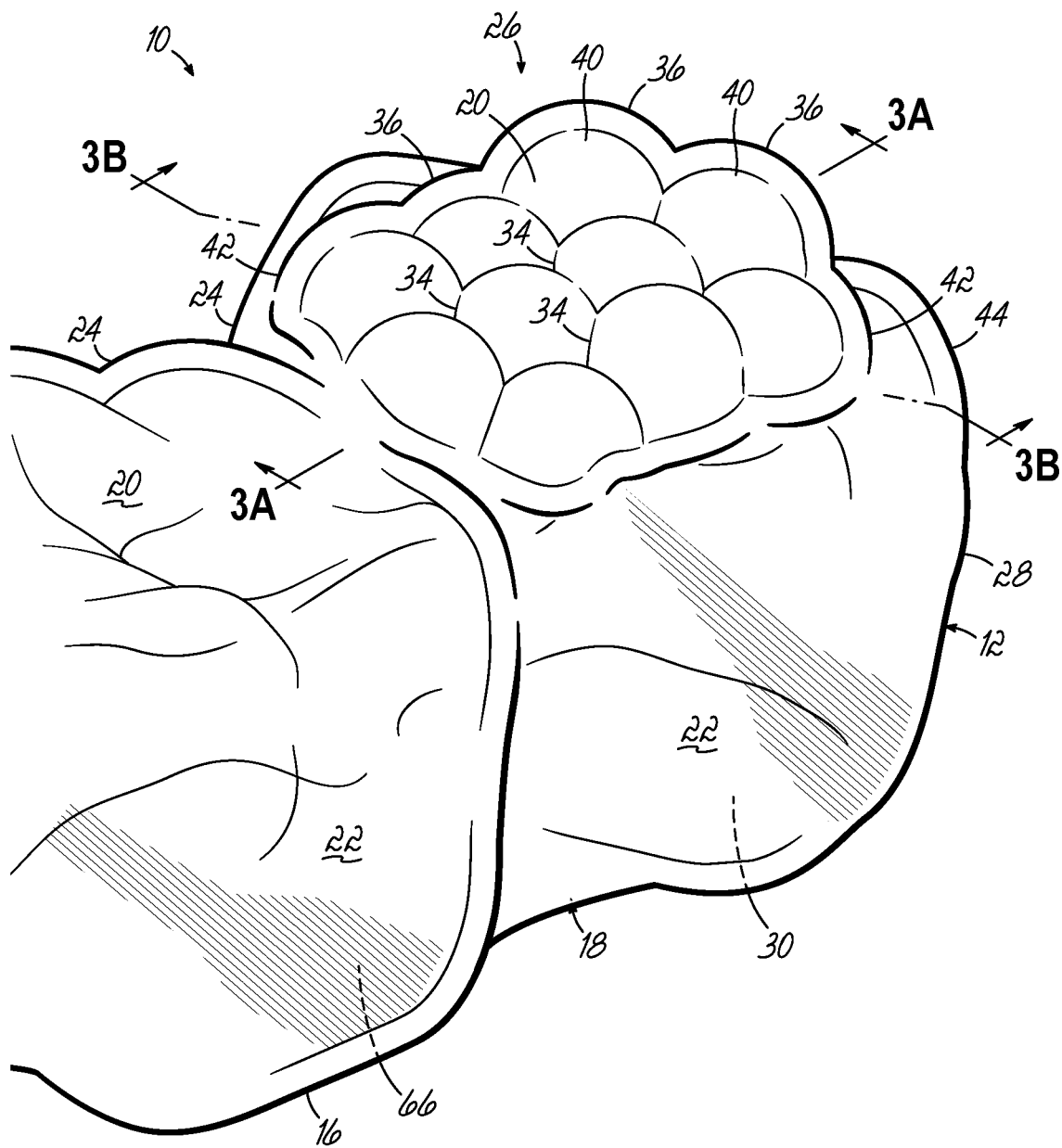
FIG. 2 is an enlarged view of the encircled area 2 of FIG. 1 illustrating a bite structure according to one embodiment of the invention.
Figure 2A:
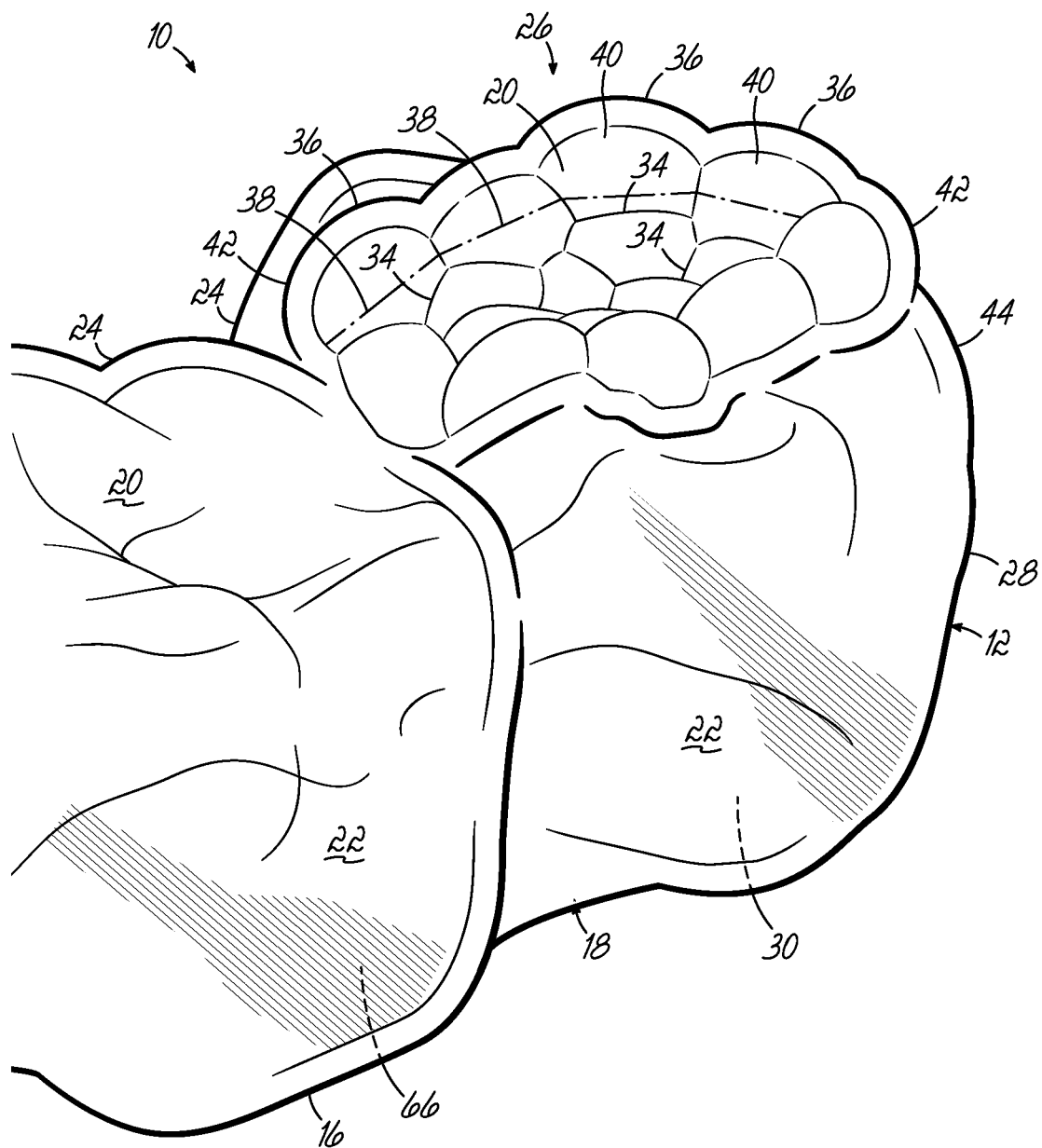
FIG. 2A is an alternative bite structure according to one embodiment of the invention.
Figure 3A:
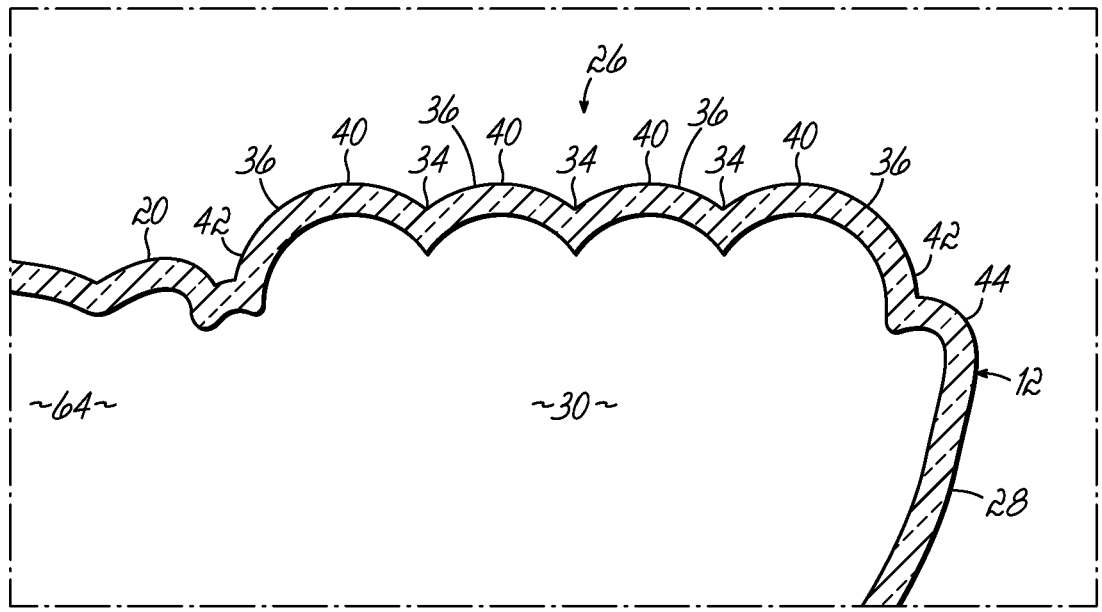
FIG. 3A is a cross-sectional view of the bite structure shown in FIG. 2 taken along section line 3A-3A.
Figure 3B:
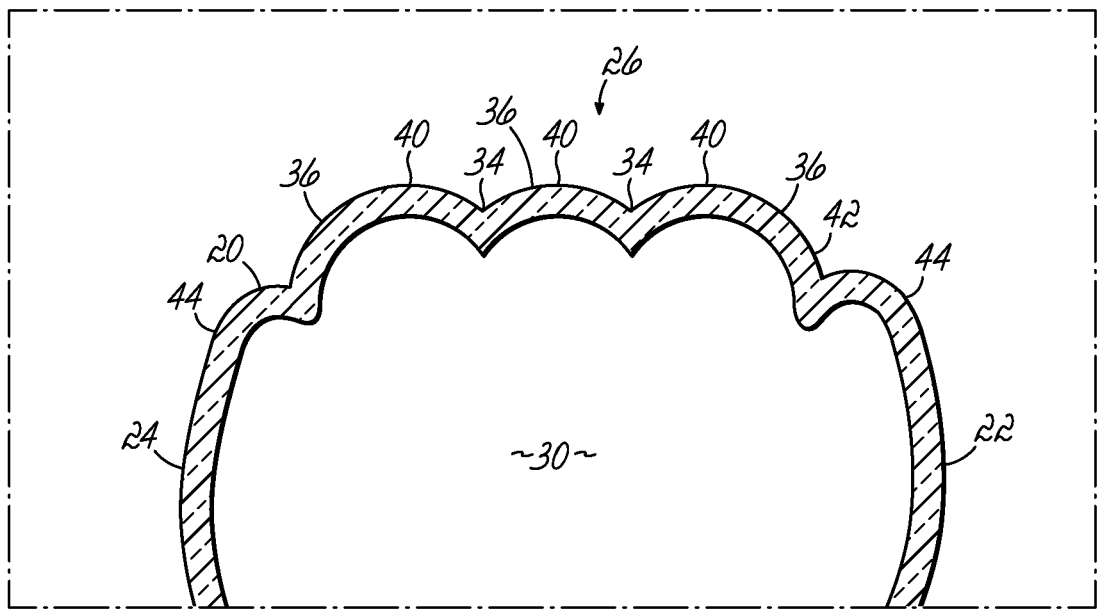
FIG. 3B is a cross-sectional view of the bite structure shown in FIG. 2 taken along section line 3B-3B.

To these and other ends, referring to FIGS. 1 and 2, in an exemplary embodiment of the invention, an aligner 10 includes a shell 12 that encapsulates one or more crowns of a patient's teeth. In the embodiment shown, the shell 12 is formed with a plurality of cavities 14 that collectively define an edge 16. The edge 16 follows an opening 18 in the shell 12 by which the aligner 10 is placed on the patient's teeth. Each cavity 14 is designed to receive a specific one of the patient's teeth through the opening 18. During orthodontic treatment, the dental aligner 10 is selectively positionable over the patient's teeth and may fit tightly at least partly due to slight differences in the position of one or more of the cavities 14 relative to the corresponding tooth. A set of aligners (not shown) may include one or more dental aligners 10 (FIG. 1). In one embodiment, the shell 12 may be an elastic material in one or more layers. When worn, the elasticity of the material forces one or more teeth within their corresponding cavity 14 to move according to a predetermined treatment plan. The applied force is designed to gradually move individual teeth toward their orthodontically correct positions. Each of the aligners in the set may differ slightly so that they each provide slightly different movement of the teeth. Cumulatively, the individual movements that result from each aligner 10 may result in complete treatment of the patient's malocclusion.

To conform to the patient's teeth, individual cavities 14 may be defined at least in part by an occlusal portion 20, a labial portion 22, and a lingual portion 24 of the shell 12. The portions 20, 22, 24 of each cavity 14 generally conform to the corresponding portions of a respective one of the patient's teeth. The cavities 14 are therefore designed to fit closely (though with some slight misalignment on one or more selected teeth) to the patient's teeth when the patient wears the aligner 10. In addition, the aligner 10 includes one or more built-in bite structures 26 formed in the shell 12. The shell 12 may include distal portions 28 that encircle the cavities that receive the molar teeth.

As shown in FIGS. 1, 2, 2A, 3A, and 3B, the bite structure 26 projects outwardly from the shell 12. In the exemplary embodiment shown, the structure 26 is formed as part of the occlusal portion 20 of a cavity 30 (shown best in FIG. 2). Unlike cavities 14 of the shell 12 that are configured to generally conform to the surfaces of the patient's teeth, the cavity 30 does not conform to the patient's teeth along all surfaces. While the labial, lingual, and distal portions 22, 24, 28 of the cavity 30 may substantially conform to a corresponding surface of the patient's molar tooth, the structure 26 deviates from conformity to an occlusal surface of the patient's tooth. This configuration is described with reference to FIGS. 4A and 4B below.

With reference to FIGS. 2, 2A, 3A, and 3B, in the exemplary embodiment shown, the bite structure 26 includes a non-planar surface. The non-planar surface has a three-dimensional quality, such as a collection of spaced-apart projections 36. The space-apart projections 36 may be regularly space or irregularly spaced. As an example, regularly spaced projections 36 may appear in a uniform grid with individual projections 36 being of equal size, and irregularly spaced projections 36 may appear as a random distribution of projections 36 with individual projections 36 being of the same or different sizes.

Adjacent projections 36 meet at a boundary 34, which forms a trough-like feature in the bite structure 26. Collectively, the projections 36 and the boundaries 34 form a 3-D structure of the occlusal portion 20. The bite structure 26 may then include a series of projections 36 separated by a series of troughs. One or more of the projections 36 provide an occlusal-most location of the cavity 30 and is/are positioned to contact the corresponding tooth or aligner on the opposing jaw. In this way, the one or more projections 36 function similar to a bite turbo in orthodontic treatment and prevent full closure with the opposing teeth.

As shown, the projections 36 may be spherical-like or hemispherical in shape. Spherical-like projections 36 as domes or bubbles are shown in FIG. 2 whereas in FIG. 2A the projections 36 are ellipsoidal in shape each having an elongate axis 38 relative to two other orthogonal axes. As shown, the axes 38 be arranged to form a ring of outer projections 36. By way of example only, the ellipsoidal-shaped projections 36 may each be 3 mm long by 2 mm wide by 1 mm high. While the projections 36 are shown as spherical or ellipsoidal, other projection configuration are possible. Embodiments of the invention are not limited to spherical and ellipsoidal projections. For example, the projection 36 may be a pyramidal shape or other projections providing a difference in height between a peak and a trough. Further, the bite structure 26 is not limited to a single projection configuration throughout. That is, bite structures 26 may include a mixture of projection configurations. For example, the bite structure 26 may include a mixture of spherical and ellipsoidal-like projections 36.

With reference to FIG. 2, the exemplary bite structure 26 has a plurality of peaks 40 on individual ones of the spherical-like projections 36 (i.e., dome shaped). While each spherical-like projection 36 defines a single peak, embodiments are not limited to one peak per projection or to the dome-shaped structures shown. As shown best in FIGS. 2 and 2A, individual boundaries 34 intersect to collectively form a web of troughs that extends in two directions (i.e., a labial-lingual direction and a mesial-distal direction) across the bite structure 26. The outermost edge ones of the projections 36 form a sidewall 42 that extends occlusally from a tooth-conforming portion 44, such as the labial portion 22 and lingual portion 24, of the cavity 30. The sidewall 42 forms an outer boundary of the bite structure 26 and further elevates the spherical-like projections 36 and troughs 34 occlusally to a spaced-apart position from the corresponding tooth. While there are 10 dome shaped projections 36 shown in FIG. 2, embodiments of the invention are not limited to 10. There may be fewer or more than 10 depending on the size of the individual projections 26 and the relative size of the area to be filled with the bite structure 26. As an example, the bite structure 26 may consist of from 2 to 20 individual projections 26. By way of further example, the bite structure 26 may consist of from 4 to 10 individual projections 26. Not being bound by theory, too many small projections or two few large projections may produce a bite structure with less strength.

Figure 4A:
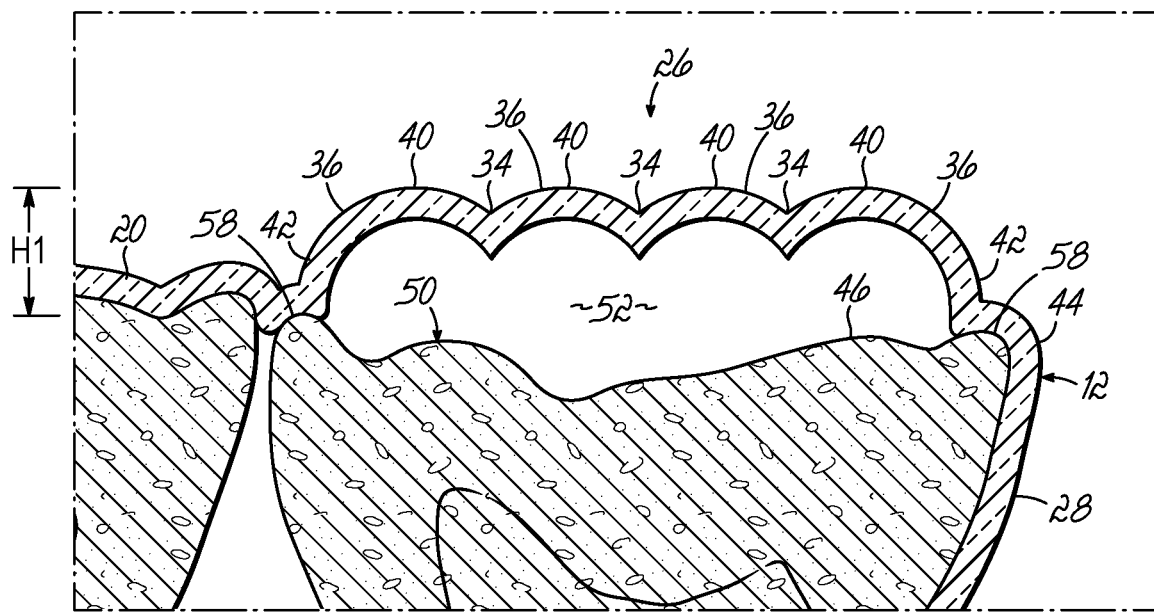
FIGS. 4A and 4B are schematic cross-sectional views of the aligner of FIG. 2 on a patient's tooth during orthodontic treatment.
Figure 4B:
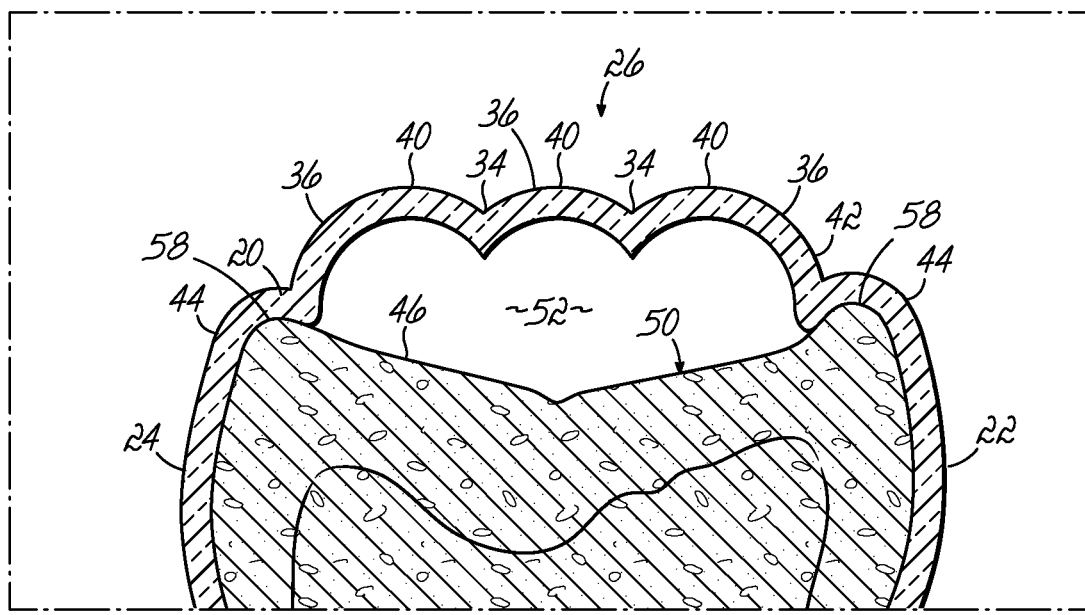

As shown in FIGS. 4A and 4B, when the aligner 10 is worn, the structure 26 is spaced apart from an occlusal surface 46 of a patient's molar 50. That is, the shell 12 does not conform to the patient's tooth 50 along at least a portion of the occlusal portion 20 formed by the bite structure 26 but conforms to the patient's tooth 50 along the labial portion 22, the lingual portion 24, and, in this case, the distal portion 28 (the distal portion 28 being present on only the distal-most molar). In the nonconforming portion, the structure 26 forms at least a portion of the occlusal portion 20 of the cavity 30 and is dimensioned to project outwardly relative to the surrounding shell 12 (e.g., the tooth-conforming portion 44) and in a direction away from the corresponding tooth 50 (e.g. molar). In the exemplary embodiment shown, the bite structure 26 projects occlusally from cusps 58 of the patient's tooth 50 with the sidewalls 42 supported on the cusps 58. In between the sidewalls 42 supported on the cusps 58, the bite structure 26 spans over the fossas and pits, as is generally shown by the surface 46 in FIGS. 4A and 4B.

The extent to which the structure 26 projects away from the tooth 50 (shown as dimension H1 in FIG. 4A) is sufficient to interfere with the full closure of the patient's jaws at the molar 50. From another perspective, in embodiments of the invention, the bite structure 26 is not formed solely into either of the lingual or labial portions 22, 24 (or distal portion 28) of any of the cavities 14 configured to receive a patient's molar teeth. While a molar tooth 50 is shown and described, the bite structure 26 may form one or more occlusal portions of other cavities configured to receive a respective tooth. Other teeth may include one or more molars and/or premolars. Although not shown, by way of example only, a bite structure according to embodiments of the invention may form an occlusal portion of any single one or each of cavities 30, 64, 66, and 68 in FIG. 1.

Because the bite structure 26 provides an occlusal-most projection of the shell, it is exposed to compression from opposing teeth. The bite structure 26 is designed to absorb compression from the forcible jaw closure (for example, casual biting during normal aligner use) without significant occlusal-gingival flattening. The capability of the bite structure 26 to resist flattening is a measure of strength. That is, the height H1 (FIG. 4A) is not significantly reduced when the structure 26 is compressed. By comparison, if the patient bites down hard, for example, under great emotional distress, it is expected that the bite structure 26 will deform. When that event has passed, the bite structure 26 will revert to its original undeformed state with height, H1. This is confirmed through laboratory testing in which a compression force of 100 N is applied to a bite structure on an aligner and the structure flattens to 50% of its original height and is not further compressible. The aligner then reverts to its original height on removal of the compressive force. Resistance to compression is not aided by material or other structure between the occlusal surface 46 of the tooth 50 and the projections 36 of structure 26. As shown, the structure 26 lacks internal support within the aligner 10. For example, no solid or liquid material is intentionally inserted between the occlusal surface 46 of the patient's molar 50 and the projections 36 or between the occlusal surface 46 and the boundaries 34. That is, only air may fill a void space 52 between the tooth 46 and the aligner 10. No foreign materials are present at this location. By way of example only, and not limitation, the height H1 is 1 mm.

Nevertheless, the structure 26 exhibits improved durability and strength when the structure 26 is compressed between opposing teeth. The improved durability and strength of the structure 26 results in an improved consistency with respect to the bite separation performance of the aligner 10. That is, where the function of a bite turbo is desired, the structure 26 of the aligner 10 provides the desired spacing consistently during use of the aligner 10. This orthodontic performance improvement is believed to be a result of the peaks 40 and boundaries 34 so that the structure 26 resists degradation during use.

Figure 5:
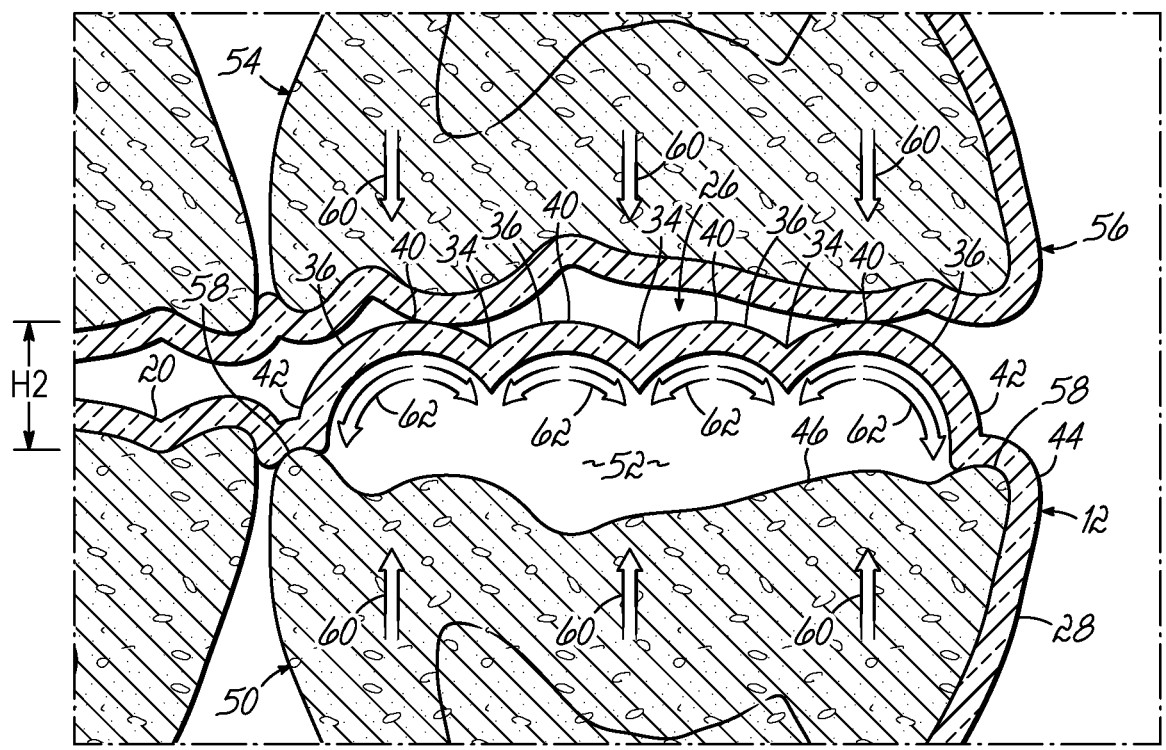
FIG. 5 is a schematic cross-sectional view of the aligner of FIG. 1 during compression of the bite structure.

In that regard, and with reference to FIG. 5, the bite structure 26 is configured to project toward the patient's opposing jaw (e.g., opposing molar 54) during use of the aligner 10. An aligner 56 may be present on the opposing jaw and so may cover the opposing molar 54. The bite structure 26 projects occlusally to contact the patient's opposing aligner 56, as shown, during orthodontic treatment when the patient brings their jaws together. The structure 26 may project sufficiently in an occlusal direction to modify the patient's bite with the tooth 54. By way of example, the structure 26 may prevent the molar 54 from being within less than height H2 from the occlusal surface 46 of the molar 50. In this way, the structure 26 modifies the patient's bite at at least this portion of the patient's jaw. With reference to FIG. 5, compressive loads (arrows 60) from mastication between the opposing aligner 56 and the aligner 10 squeeze the bite structure 26. That pressure may only partly compress the structure 26 to the height H2 that is less than the uncompressed height H1 yet prevents tooth-to-tooth contact. In other words, the bite structure 26 may flatten some but resists collapse and by doing so provides a bite-turbo like function.

With continued reference to FIG. 5, that resistance to compression and collapse prevention is thought to be a result of the spherical-like projections 36 separated by troughs 34. Mastication loads according to arrows 60 are carried by the structure 26 at contact with one or more peaks 40. Those forces (arrows 62) are distributed to the projections 36 and carried by the troughs 34 and the sidewall 42. The configuration of the peaks 40 to troughs 34 (shown best in FIG. 5) are thought to provide a key-stone-like function in multiple directions associated with the projections 36 and web of troughs 34. As shown in FIG. 2, for example, the troughs 34 are continuous to and from each sidewall 42 in the structure 26. This arrangement creates a grid-like reinforcement, which may be similar to the function of an I-beam in the plane of the structure 26, and supported on the sidewalls 42. That is, the grid-like reinforcement spans the structure 26 side to side to opposing sidewalls 42. It is believed that the structure 26 resists and distributes normal mastication loads to conforming portions 44 of the aligner 10 without significant deformation.

As described below with reference to FIGS. 6-13, a user may opt to place a bite structure on any single one of the aligners forming part of an orthodontic treatment planning process. As described herein, a user may be a person who is not the patient and may be trained to design aligners to implement an orthodontic treatment plan as provided by a clinician. The user may therefore be a designer or could alternatively be the clinician, such as the patient's doctor or other personal who reports to the doctor. Reference to user, clinician, or doctor herein is not limiting to embodiments of the invention. With reference to FIGS. 6-13, as an example, the clinician may add a bite structure to one or more cavities of an aligner during one portion of the orthodontic treatment and then add a different bite structure to one or more different cavities of a different aligner during another portion of the orthodontic treatment. These modifications occur prior to manufacturing the aligners. Further, although one bite structure is described with respect to one aligner, multiple bite structures may be formed on a single aligner or on multiple aligners during any single orthodontic treatment plan. Thus, the clinician may develop a treatment plan having a plurality of bite structures that change in orientation and in location from aligner to aligner during treatment. Embodiments of the invention are not limited to a single aligner with a single structure as is shown in the figures.

To that end, according to one aspect of the invention, a clinician may selectively locate and configure one or more bite structures on one or more aligners during orthodontic treatment planning. As is described below, the clinician may model virtual bite structures prior to having an aligner including that bite structure manufactured. One exemplary embodiment of designing bite structures and manufacturing an aligner having those structures is described with reference to FIGS. 6-13.

Figure 6:
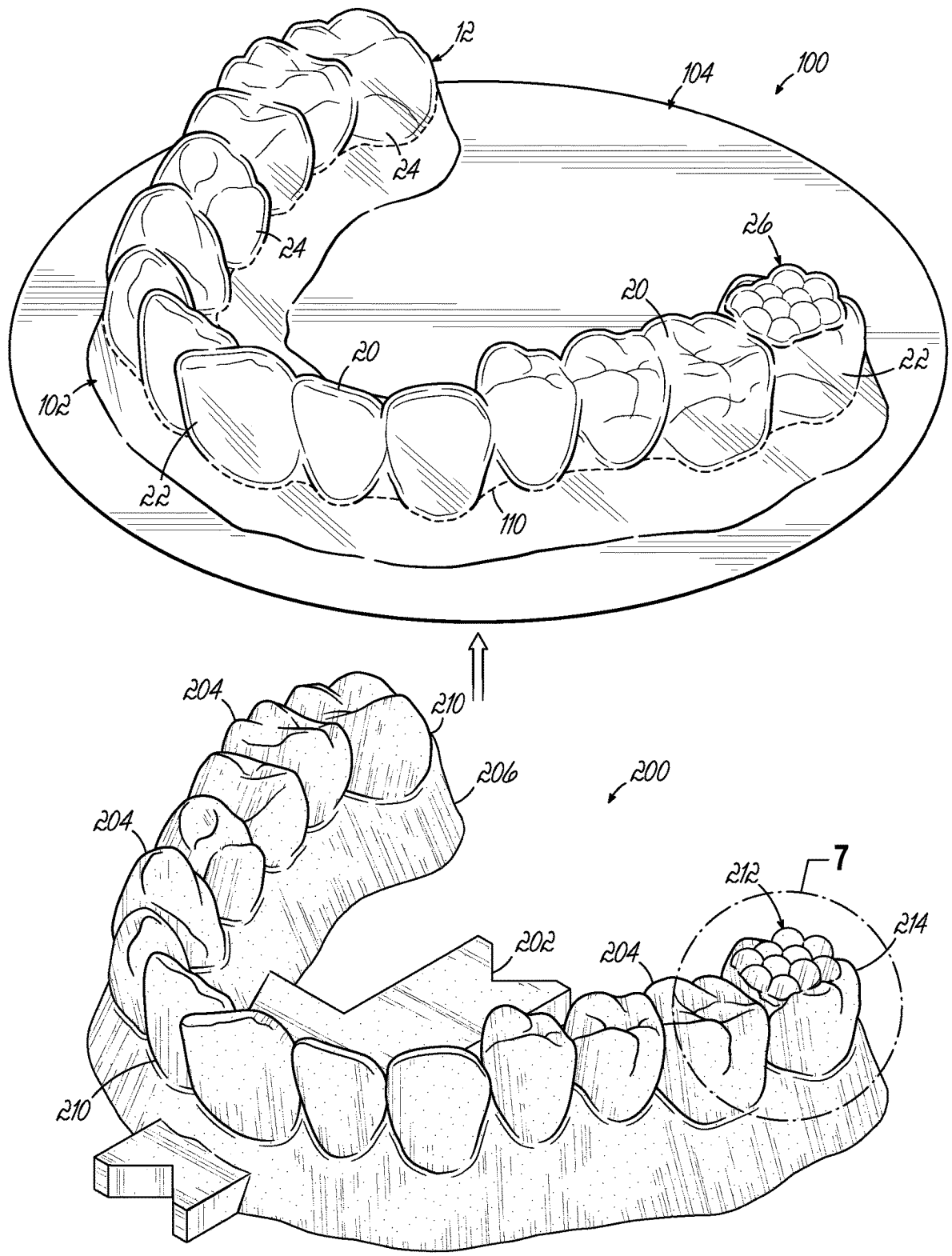
FIG. 6 is a perspective view of a worksheet following forming thereof over a mold in the process of manufacturing an aligner according to an embodiment of the invention.

With reference to FIG. 6, the aligner 10 shown in FIG. 1 may be manufactured by thermoforming a workpiece 100 over a mold 200. As shown, following thermoforming and removal from the mold 200, the workpiece 100 includes a deformed region 102 and a generally undeformed region 104. The deformed region 102 ultimately becomes the aligner 10 following separation of the deformed region 102 from the worksheet 106 along a trim line 110. Separation at the trim line 110 may be achieved automatically or may require a machining operation (e.g., CNC machining) by which the deformed region 102 is cut away from the undeformed region 104. While not specifically described, the aligner 10 having the bite structure 26 shown in FIG. 2A may be similarly manufactured.

Once separated, the aligner 10 may undergo additional processing before can be utilized in orthodontic treatment. For example, the edge 16 (FIG. 1) following machining from the undeformed region 104 may require polishing before it is suitable for use during orthodontic treatment. The workpiece 100 may be fabricated from any suitable thermally formable material, and, in the exemplary embodiment, may be a sheet of a thermoplastic. As shown, the workpiece 100 may be circular and be of uniform thickness, though embodiments of the invention are not limited to a particular material or a particular worksheet configuration.

Although not shown as one of a series of molds, the mold 200 may be one of a series of molds each fabricated based on a corresponding computer model of the patient's dentition. Each mold in the series captures a target orientation of the patient's teeth during orthodontic treatment. Each mold 200 may include a base 202 that supports a plurality of projections 204 in the form of molded teeth that extend from a molded gum 206 (i.e., gingiva). A junction between the molded teeth 204 and the molded gum 206 defines a gingival margin 210. In this arrangement of the mold 200, each molded tooth 204 may have an orientation that produces a corresponding cavity 14 in the dental aligner 10 with the gingival margin 210 ideally providing a limiting boundary for the location of the edge 16 of the dental aligner 10. The edge 16 (FIG. 1) is ideally spaced apart in an occlusal direction from the gingival margin 210 so that the edge 16 does not contact the patient's gum during orthodontic treatment. The forming process shown causes the workpiece 100 to deform with each of the molded teeth 204 producing a corresponding cavity 14 (labeled in FIG. 1) in the aligner 10. The deformed region 102 includes the bite structure 26 and is established by features of the mold 200 including a molded structure 212 on a molded molar 214. The bite structure 26 is integrated into the workpiece 100 as it is deformed and so the bite structure 26 is integral to the shell 12. In other words, the bite structure 26 is not an additional structural component that is adhered to the shell 12 follow formation of the shell 12. The computer model used to manufacture the molds may be generated, for example, based on the patient's initial dentition.

By way of example, the orthodontist may obtain an impression of the patient's dentition using a suitable impression material. This impression may then be scanned into a computer using a three-dimensional scanning device to generate a three-dimensional computer model of the patient's initial dentition. The three-dimensional scanning device may also be used to obtain the computer model by directly scanning the patient's dentition.

The computer model of the initial dentition may be used by the orthodontist as a starting point to generate a target dentition model and one or more intermediate dentition models. The target dentition model may represent a desired positioning of the patient's teeth at the conclusion of orthodontic treatment. Thus, during an orthodontic treatment planning process, a series of computer models that provides incremental steps from the initial dentition to the one or more intermediate dentition models and ending with the target dentition is generated. Any single one of the dentition models may be modified to include one or more molded structures 212, shown best in FIG. 7. Once the computer dentition models have been generated, one or more molds 200 may be fabricated from the virtual models using additive manufacturing, CNC machining, a combination of these, or any other suitable method.

Figure 7:
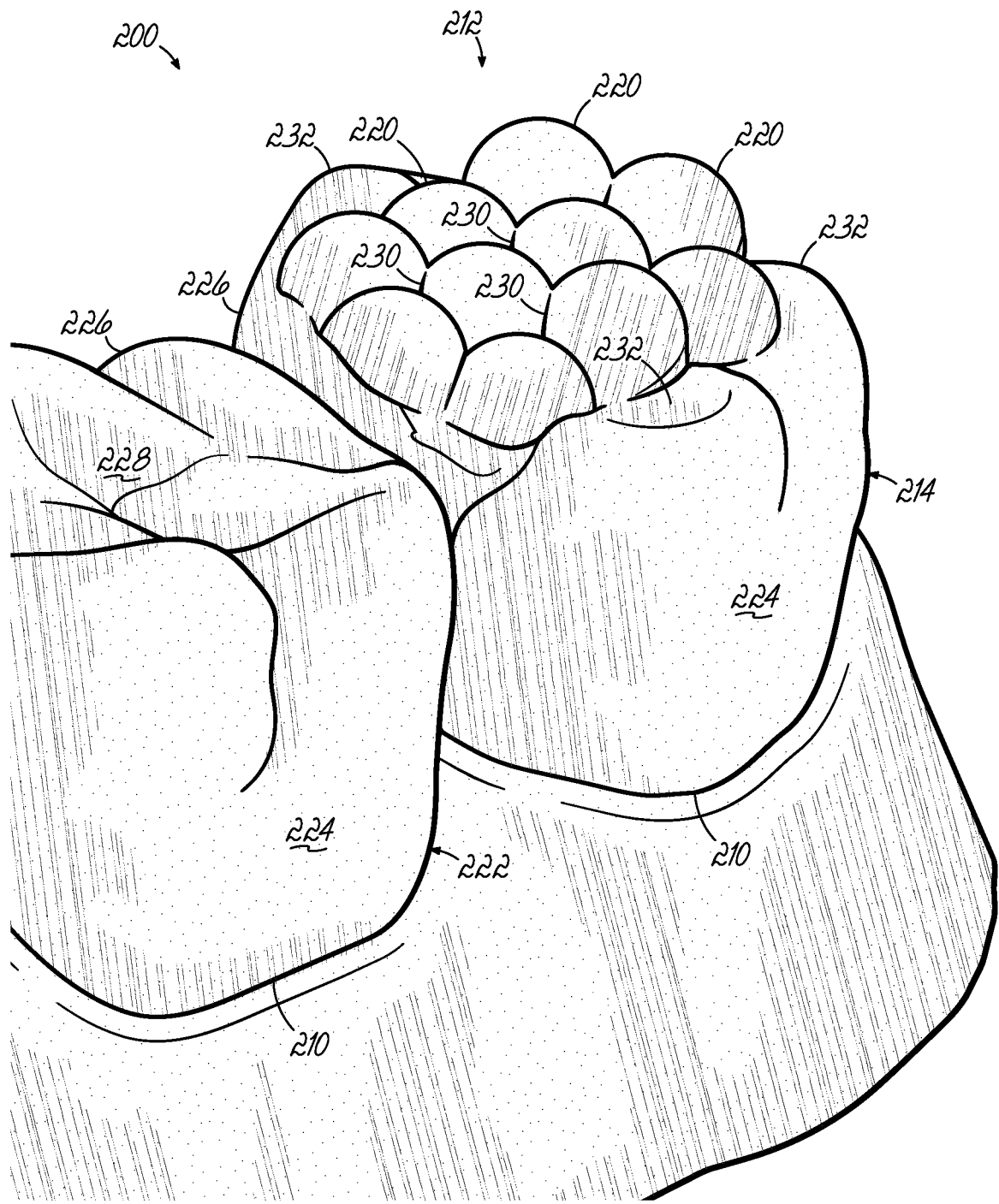
FIG. 7 is an enlarged view of the encircled area 7 shown in FIG. 6 illustrating a molded structure on a tooth mold.

With reference to FIG. 7, the molded molar 214 defines a labial surface 224 and a lingual surface 226 to which labial and lingual portions 22 and 24 of the cavity 30 (shown in FIG. 1) conform. As shown the molded structure 212 projects occlusally from the molded molar 214. By comparison, the adjacent molded tooth 222 lacks a molded structure. Instead, an occlusal surface 228 of the molded tooth 222 is a molded representation of an occlusal surface of the patient's tooth.

The molded structure 212 includes a plurality of molded projections 220 that correspond to the projections 36 and define the peaks 40 of the bite structure 26. In that regard, the molded projections 220 may be spherical-like or hemispherical in shape. And, the molded projections 220 meet at valleys 230 that define the boundaries 34. With this configuration, the exemplary molded structure 212 has a plurality of peaks on individual ones of the molded projections 220 (i.e., dome shaped). As shown best in FIG. 7, individual valleys 230 intersect to collectively form a web that extends in two directions (i.e., a labial-lingual direction and a mesial-distal direction) so as to crisscross the molded structure 212. The outermost edge ones of the molded projections 220 extend occlusally from the molded molar 214. Although not limited thereto, by way of example only, the molded structure 212 fills a region of the occlusal surface of the molded tooth 224 between a plurality of cusps 232. However, the molded structure 212 projects away from the molded molar 214 beyond the cusps 232 so as to provide an occlusal-most projection on the molded molar 214. In this way, the molded structure 212 essentially fills the fossas and pits in the molded molar 214, which are shown on adjacent tooth 222 in FIG. 7.

Referring now to FIGS. 8-13, each mold 200 is a physical representation of a virtual model of the patient's teeth at a particular tooth orientation during treatment. Any molded tooth may be subject to modification to include the molded structure 212 according to the process described and shown with respect to FIGS. 8-13. One exemplary tooth is shown in FIGS. 9-13.

Figure 8:
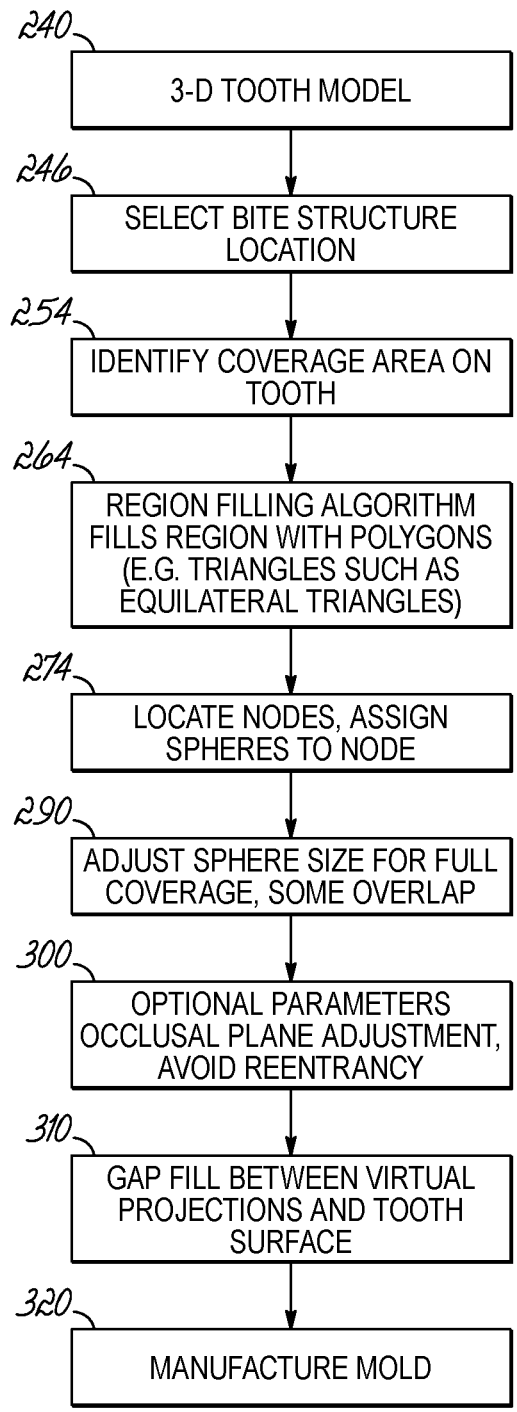
FIG. 8 is a flowchart illustrating a method of manufacturing the aligner shown in FIG. 1 according to one embodiment of the invention.
Figure 9:
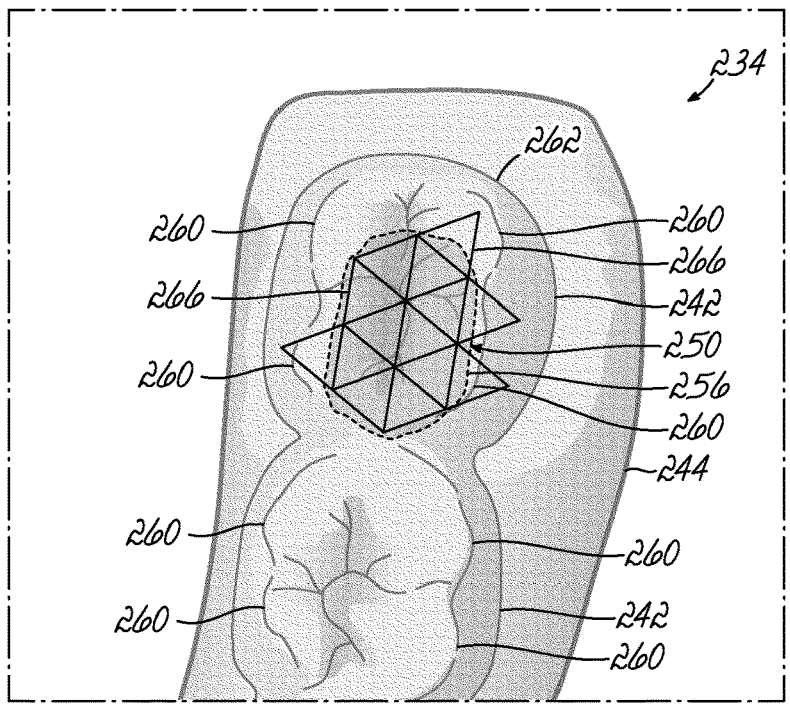
FIG. 9 is a plan view of model teeth illustrating an occlusal region selected to which a virtual bite structure is to be added.

Referring to FIGS. 8 and 9, a virtual tooth model 234 of the patient's dentition is prepared at 240. The virtual tooth model 234 precedes the manufacturing of the corresponding mold 200. The virtual tooth model 234 includes virtual teeth 242 which correspond to projections 204 of the mold 200 shown in FIG. 6. The virtual model 234 may also include a virtual gum 244 from which the molded gum 206 (FIG. 6) is constructed. With the virtual tooth model 234 available during orthodontic treatment planning, the clinician may determine that a bite turbo or similar structure on one or more teeth may be beneficial to orthodontic treatment. In exemplary embodiments, according to one aspect, there is a method of creating, editing, and producing a virtual bite structure 252 (see FIG. 10). The clinician uses a computer system to create and edit the position of the virtual bite structure 252 relative to the virtual tooth model 234.

Figure 22:
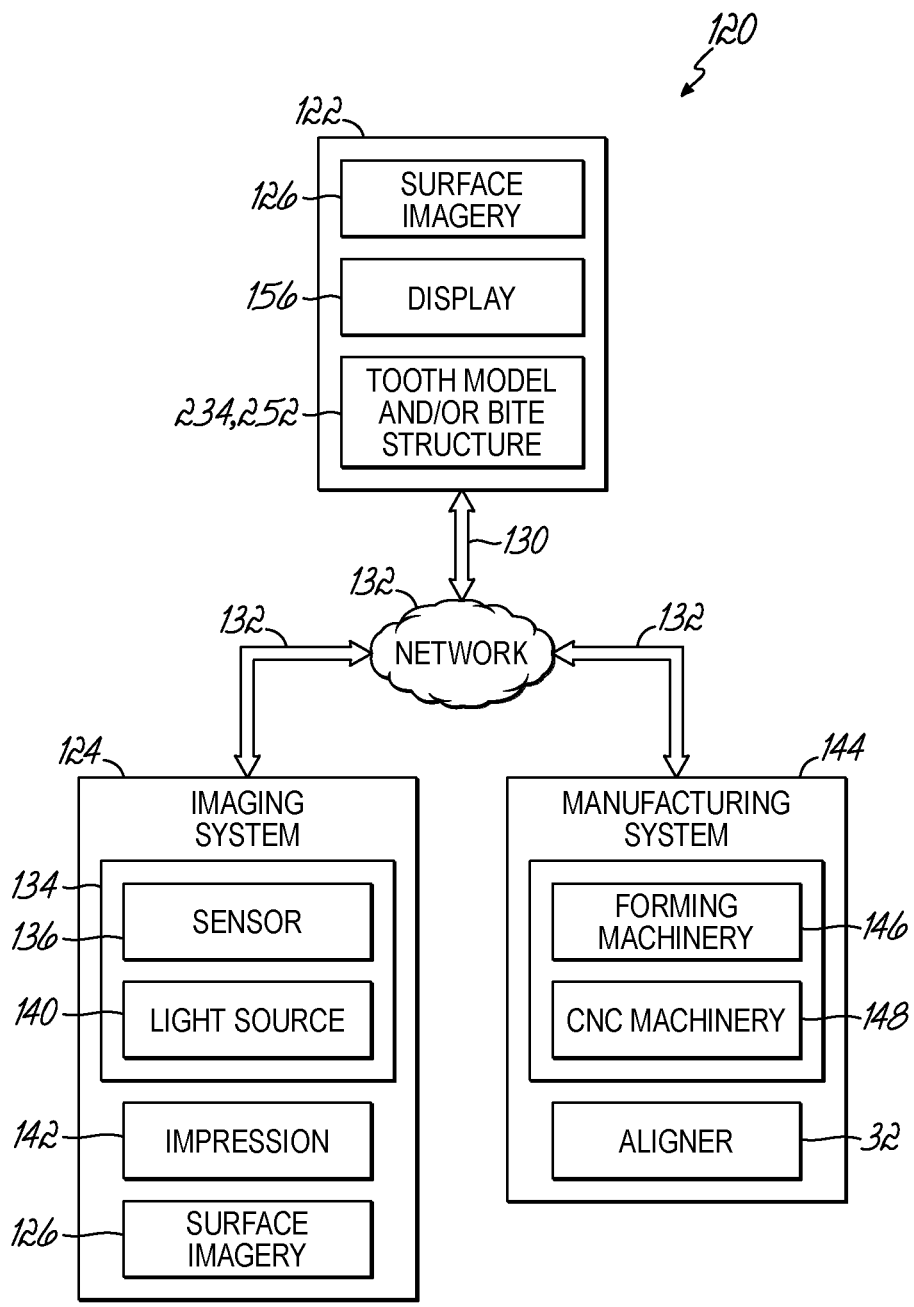
FIG. 22 is a schematic view of a system according to one embodiment of the invention.
Figure 23:
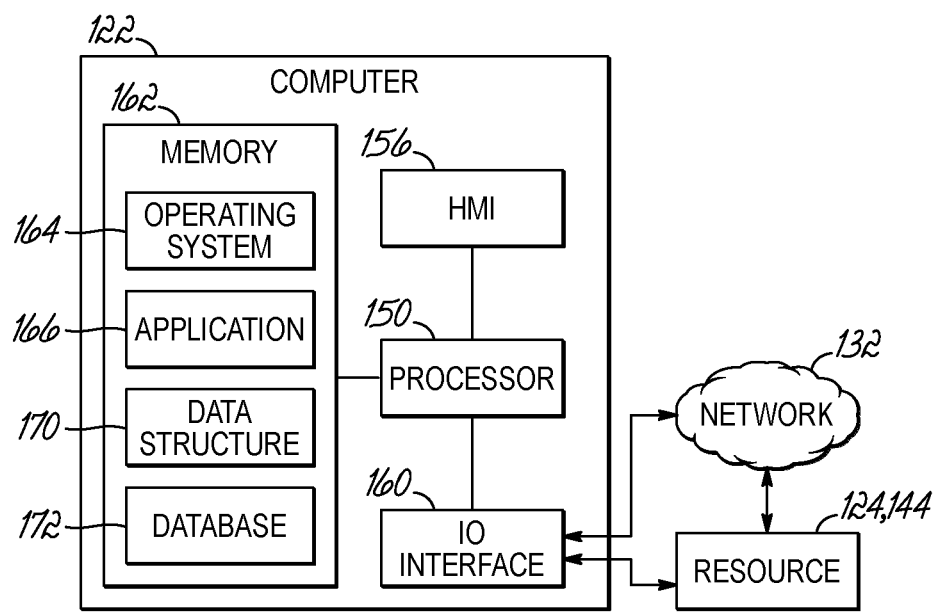
FIG. 23 is a schematic view of a computer device usable with the system of FIG. 22.

With reference to FIGS. 22 and 23, in a computer implemented method, according to one embodiment, a clinician obtains or is provided with images of a patient's teeth, particularly the crowns of the patient's teeth, such as with an intraoral scanning device or PVS impression. The clinician may also obtain image information of the roots and crowns of the patient's teeth, such as volumetric data acquired from cone beam computed tomography (CBCT). The images may be in or importable into a 3-D virtual computer environment. With one or both forms of data, virtual tooth model 234 is produced. By way of example only, systems and methods of preparing virtual models of a patient's teeth are known according to at least U.S. Pub. Nos. 2018/0165818 and 2014/0272772, which are assigned to Ormco Corporation and are incorporated by reference herein in their entireties.

In an exemplary embodiment and with reference to FIGS. 22 and 23, a system 120 includes a computer 122 and at least one imaging system 124. The computer 122 may receive multiple imageries from imaging system 124 and/or another imaging system. Imagery may include surface imagery 126 of one or more of the patient's teeth. The computer 122 may include any suitable computational device, such as a personal computer, a server computer, a mini computer, a mainframe computer, a blade computer, a tablet computer, a touchscreen computing device, a telephonic device, a cell phone, a mobile computational device, dental equipment having a processor, etc. In certain embodiments, the computer 122 may provide web services or cloud computing services. More than one computer may also be used for storing data and/or performing the operations performed by the computer 122 in accordance with the embodiments of the invention. In the embodiment shown, while not being limited to any particular network, the computer 122 is operatively coupled via one or more wired or wireless connections 130 to the imaging system 124 over a network 132. The network 132 may comprise a local area network, the Internet, an intranet, a storage area network, or any other suitable network.

With regard to an intra-oral imaging system, imaging system 124 may include a wand 134 having an imaging sensor 136 and a light source 140. The imaging sensor 136 may be an intra-oral camera that captures information regarding the oral cavity of the patient when exposed to light, for example from the light source 140. As is known, the user may insert at least a portion of the wand 134 into the patient's mouth. Using the light source 140 and the imaging sensor 136, the user may capture data of all or selected crowns of the patient's teeth. Alternatively, surface imagery 126 may be produced by scanning an impression 142 of the patient's teeth. The system 120 may also include or be in electrical communication (e.g., via network 132) to a manufacturing system 144 capable of manufacturing the aligners 10 and/or molds (described below). The manufacturing system 144 may include both forming machinery 146 and CNC machinery 148. Without being limited to the configuration shown in FIG. 22, each of the computer 122, imaging system 124, and manufacturing system 144 may be owned and operated by different entities. For example, an orthodontist may own the imaging system 124 and so provide the surface imagery 126 to a designer, who owns the computer 122. The designer prepares an orthodontic treatment plan with one or more aligners 10 according to embodiments of the invention described herein. The orthodontist may approve the treatment plan prior to transfer of information necessary for making the mold 200 from the designer to the manufacturing system 144. The entity who owns the manufacturing system 144 then manufactures the molds 200 and aligners 10 for shipment to the orthodontist or to the patient.

Referring now to FIGS. 22 and 23, embodiments of the invention described above, or portions thereof, such as the system 120 may be implemented using one or more computer devices or systems, such as exemplary computer 122. The computer 122 may include a processor 150, a memory 152, an input/output (I/O) interface 154, and a Human Machine Interface (HMI) 156. The computer 122 may also be operatively coupled to one or more external resources, such as imaging sensor 136 and CBCT system or machining center 144, via a network 132 and/or I/O interface 160. External resources may include, but are not limited to, servers, databases, mass storage devices, peripheral devices, cloud-based network services, or any other resource that may be used by the computer 122.

The processor 150 may include one or more devices selected from microprocessors, micro-controllers, digital signal processors, microcomputers, central processing units, field programmable gate arrays, programmable logic devices, solid state machines, logic circuits, analog circuits, digital circuits, or any other devices that manipulate signals (analog or digital) based on operational instructions that are stored in memory 162. Memory 162 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 150 may operate under the control of an operating system 164 that resides in memory 152. The operating system 164 may manage computer resources so that computer program code embodied as one or more computer software applications or algorithms, such as an application 166 residing in memory 152, may have instructions executed by the processor 150. In an alternative embodiment, the processor 150 may execute the application 166 directly, in which case the operating system 164 may be omitted. One or more data structures 170, for example the virtual tooth model 234 with or without the virtual bite structure 252, may also reside in memory 162, and may be used by the processor 150, operating system 164, or application 166 and is manipulated by the user.

The I/O interface 160 may provide a machine interface that operatively couples the processor 150 to other devices and systems, such as the external resource 124, 144 or the network 132. The application 166 may thereby work cooperatively with the external resource 124, 144 or network 132 by communicating via the I/O interface 160 to provide the various features, functions, applications, processes, or modules comprising embodiments of the invention. The application 166 may also have program code that is executed by one or more external resources 124, 144, or otherwise rely on functions or signals provided by other system or network components external to the computer 122. Indeed, given the nearly endless hardware and software configurations possible, persons having ordinary skill in the art will understand that embodiments of the invention may include applications that are located externally to the computer 122, distributed among multiple computers or other external resources 124, 144, or provided by computing resources (hardware and software) that are provided as a service over the network 132, such as a cloud computing service.

The HMI 156 may be operatively coupled to the processor 150 of computer 122 in a known manner to allow a user (e.g., a designer) to interact directly with the computer 122 to, for example, operate user interface 156. The HMI 156 may include video or alphanumeric displays, a touch screen, a speaker, and any other suitable audio and visual indicators capable of providing data to the user. The HMI 156 may also include input devices and controls such as an alphanumeric keyboard, a pointing device, keypads, pushbuttons, control knobs, microphones, etc., capable of accepting commands or input from the user and transmitting the entered input to the processor 150.

A database 172 may reside in memory 152 and may be used to collect and organize data used by the various systems and modules described herein. The database 172 may include data and supporting data structures, for example virtual tooth model 234 and/or predetermined parameters 254, that store and organize the data. In particular, the database 172 may be arranged with any database organization or structure including, but not limited to, a relational database, a hierarchical database, a network database, or combinations thereof. A database management system in the form of a computer software application executing as instructions on the processor 150 may be used to access the information or data stored in records of the database 172 in response to a query, where a query may be dynamically determined and executed by the operating system 164, other applications, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures (e.g., the virtual tooth model 234 with and without bite structures 252), program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network. As an example, and with reference to FIG. 22, virtual tooth models 234 with or without bite structures 252 may be stored on a computer-readable storage medium in computer 122 prior to being transferred to a computer-readable storage medium in manufacturing system 144. Alternatively, the manufacturing system 144 may access the computer-readable storage medium in computer 122 via network 132 during manufacturing of molds and/or aligners 10 according to embodiments of the invention.

Referring now to FIG. 8, at 246, rather than preparing the tooth with a bite turbo, which is typically attached to the patient's tooth during orthodontic treatment, the clinician may build the bite structure 26 in the aligner 10 (see e.g., FIG. 1). To do so, the clinician selects a location 250 on the virtual tooth model 234 for placement of a virtual bite structure 252 (see FIG. 10). As described above, the location 250 may be selected to prevent jaw closure at that tooth location for a predetermined time period.

At 254, the clinician may identify and select a coverage area of the virtual bite structure 252 on the virtual tooth 242. As shown in FIG. 9, the location 250 may incorporate an enclosed region 256 between a plurality of virtual cusps 260 of the selected virtual tooth 262. The region 256 may therefore be concave because it may follow the occlusal surface (i.e., a surface partly defined by fossa, pits, and/or grooves) of the virtual tooth 262. The region 256 shown in FIG. 9 may have an irregular shape that may extend to and possibly overlap each or one or more of the virtual cusps 260.

Figure 10:
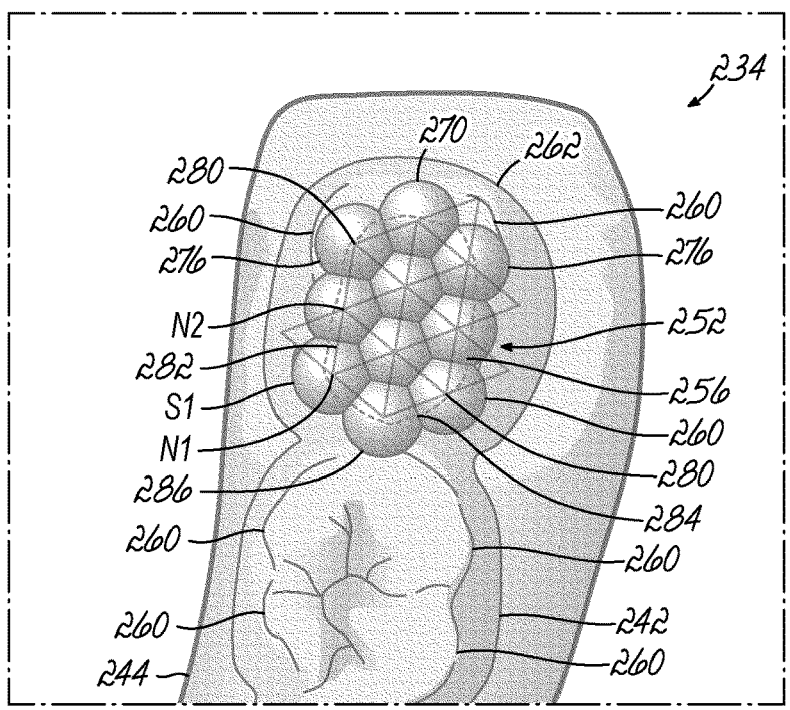
FIG. 10 depicts the model teeth of FIG. 9 following initial placement of the virtual bite structure to the occlusal region.

Once the region 256 is identified and selected, at 264, a region-filling algorithm determines an efficient fill pattern for a plurality of virtual projections 270 (shown in FIG. 10). As shown in FIG. 9, the algorithm is designed to fill the enclosed region 256 with a plurality of polygons 266. The polygons 266 may be equal-sided polygons, though embodiments are not limited to the polygons being equal-sided, other space filling polygons may be utilized. The enclosed region 256 may be filled with the polygons 266 without gaps between the adjacent polygons 266. To do so, the region 256 is filled so that the polygon 266 share sides with adjacent polygons 266. As an example, the polygons 266 shown in FIG. 9 are equilateral triangles in which adjacent polygons share a common side along the entire length of the side. Further, the algorithm may overfill the enclosed region 256 in some locations by placing polygons 266 so that they extend outside of the enclosed region 256. Similarly, the algorithm may underfill the enclosed region 256 at other locations by placing polygons 266 within the enclosed region 256 but leaving space between the polygons 266 and a boundary (indicated at 250 in FIG. 9) of the enclosed region 256. This is illustrated in FIG. 9 in which the polygons extend beyond the boundary of the enclosed region 256 at locations along the boundary 250 but do not reach the boundary 250 at other locations. The clinician may define user defined boundary conditions for the algorithm when the enclosed region 256 is filled with the polygons 266. These boundary conditions may include the size of the polygons 266 as well as the extent to which any polygon 266 may extend beyond the boundary of the enclosed region 256 and be utilized for creating the virtual bite structure 252. For example, a percentage of fill of the enclosed region 256 may be predetermined. As specific examples, the enclosed region 256 may be 100% filled in which the polygons 266 are brought to the boundary 250. Other predetermined percentages include 80% (i.e. underfill) or 110% (i.e., overfill).

Once the enclosed region 256 is filled with polygons 266, at 274 in FIG. 8, a three-dimensional shape 276 is assigned to the polygons 266 in the enclosed region 256. The three-dimensional shape 276 defines the projections 270. The methodology of the assignment and placement of the three-dimensional shapes 276 ensures complete coverage of the enclosed region 256 with the three-dimensional shapes 276. As shown by way of example in FIG. 10, the three-dimensional shape 276 is a sphere. In that case and in one embodiment, a plurality of spheres 276 is assigned to the enclosed region 256. Each sphere 276 is located at a node 280 as determined by the polygons 266 in the enclosed region 256. The spheres 276 are sized to eliminate unfilled areas in the enclosed region 256. By way of example only, assignment of the spheres 276 includes placement of a center of each sphere 276 to coincide with a respective node 280 which is shared by at least two polygons 266. In the exemplary embodiment in which the polygons 266 are equilateral triangles, up to six polygons 266 may share a single node 280. For those polygons 266 that extend outside of the boundary 250, a sphere 276 may or may not be assigned to a node 280 depending on the distance that the node 280 is outside of the region 256. As an example, nodes 280 outside of the boundary 250 by more than a distance associated with the predetermined underfill or predetermined overfill are excluded so that no shape is assigned to that node 280. This may prevent spheres 276 from being assigned to locations that cause problems with mold manufacturing and/or aligner formation. By way of example, in all conditions, the algorithm evaluates the three-dimensional shapes 376 placement against the selected virtual tooth 262 for reentrancy which may be visualized as a floating sphere. This may create molding and aligner formation problems. While not shown, the three-dimensional shape 276 may be an ellipsoid that produces the ellipsoid projection shown in FIG. 2A. The process by which ellipsoids are utilized may be the same as that shown and described with respect to spheres.

While the size of any individual one of the three-dimensional shapes 276 may be set prior to locating the nodes 280 or otherwise in advance of step 274, at 290 in FIG. 8, the three-dimensional shapes 276 may be resized to fully fill the enclosed region 256. The goal for filling the enclosed region 256 is to eliminate any areas in the enclosed region 256 that are not covered with three-dimensional shapes 276. That is, the three-dimensional shapes 276 provide a continuous and uninterrupted surface within the region 256. This ensures a continuous peak and grid construction of the bite structure 26. That continuous and uninterrupted surface may extend beyond the boundary 250 at all locations of the enclosed region 256 as is shown in FIG. 10 and may extend beyond one or more of the virtual cusps 260. By way of example, in one embodiment in which three-dimensional shapes 276 are spheres, the radius of each sphere 276 is set to be greater than one half the length of a line segment defining one side of the corresponding polygon 266. The clinician may adjust this radius dimension of the sphere 276 and visually confirm that the spheres 276 fill the enclosed region 256. As described above, the size of the three-dimensional shape 276 may be set prior to step 274 or be subject to adjustment in step 290, each according to the surface coverage boundary conditions.

As an example, and with reference to FIG. 10, the line segment 282, which extends between node N1 and node N2, determines the size of a sphere S1. In one embodiment, the sphere S1 has a radius that is greater than one half the distance between N1 and N2 (i.e., greater than one-half the length of line segment 282). By way of further example only, the radius of each sphere 276 is set to provide an overlap of at least 20% with each adjacent sphere 276. With the geometry shown in FIG. 10, if one-half distance between N1 and N2 is D, and the radius of the sphere 276 is set to 1.2×D, then the overlap between adjacent spheres is stated to be 20%. And, if the radius of the sphere 276 is set to D then the overlap is 0%. A similar construction is determined for each of the spheres 276, rather than each sphere individually or, when the enclosed region 256 is filled with equilateral triangles 266 of the same size, the radius of each sphere 276 used to fill the enclosed region 256 is equal. In that case, as shown in FIG. 10, the oversized dimensions of the spheres 276 results in a planar boundary 284 between adjacent spheres 276. Spheres 276 forming a perimeter of the virtual bite structure 252, such as sphere 286, provide a curved, spherical surface and form a sidewall of the virtual bite structure 252. The virtual bite structure 252 may be further modified depending on the orthodontic treatment desired as is described below.

Figure 11:
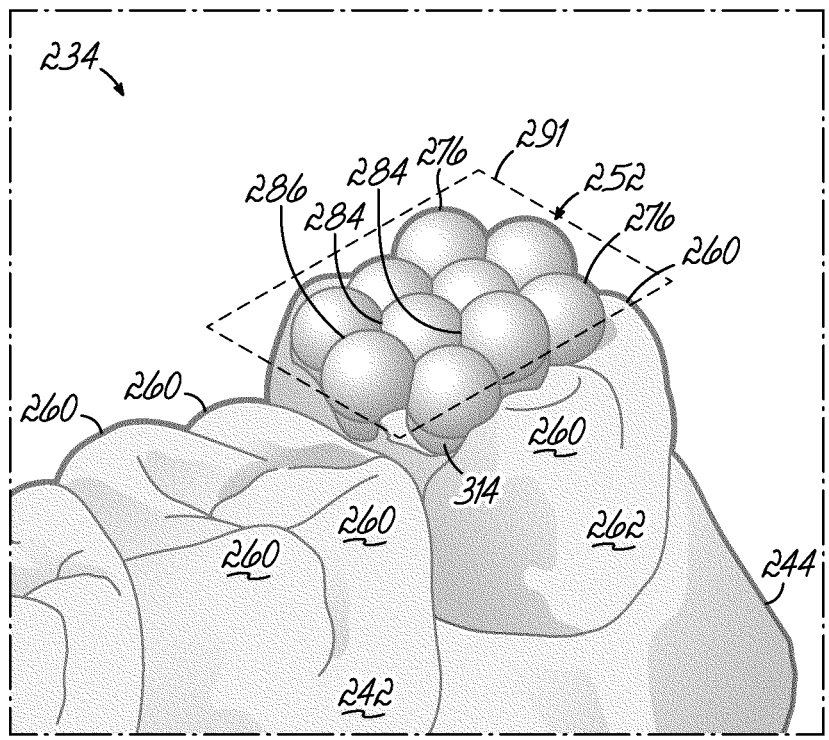
FIG. 11 is a perspective view of the virtual bite structure added to the occlusal region of a virtual tooth model according to one embodiment of the invention.
Figure 11A:
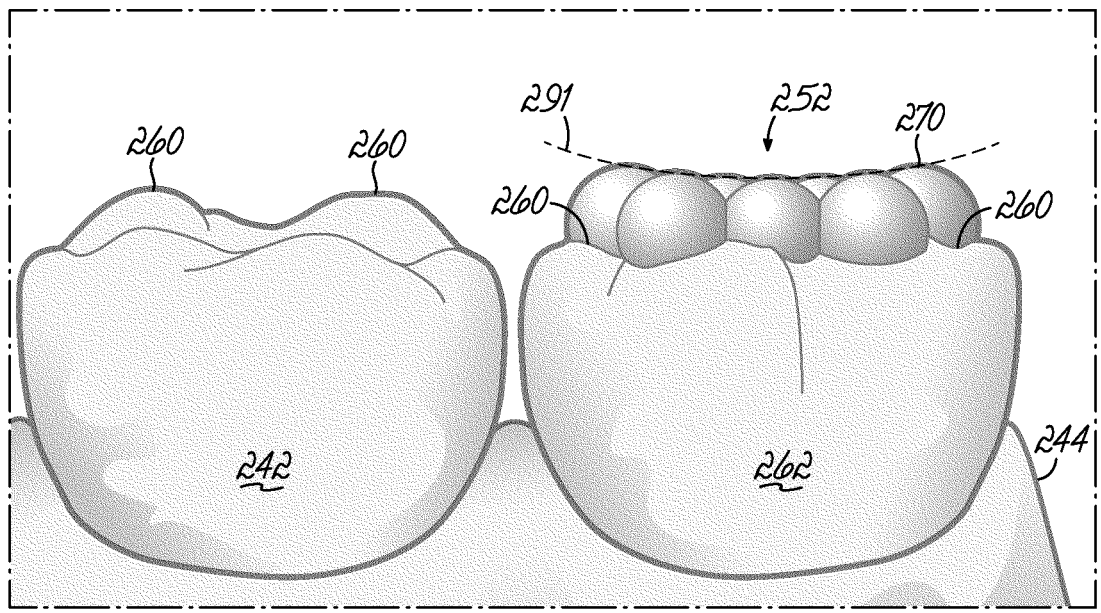
FIGS. 11A, 11B, and 11C are elevation views of the virtual bite structure shown in FIG. 11 following various dimensional modifications.

For example, at 300 in FIG. 8, the virtual bite structure 252 defines an outwardly-facing surface 291, labeled in FIG. 11. With reference to FIGS. 11, 11A, 11B, and 11C, the location and orientation of the outwardly-facing surface 291 is user-modifiable and is generally defined by the projections 270 of the three-dimensional shapes 276. The virtual bite structure 252 as shown in FIG. 11A is curved, at least according to the different occlusal-gingival locations of the three-dimensional shapes 276 in the enclosed region 256. For example, the three-dimensional shapes 276 of the virtual bite structure 252 follow a curvature of the occlusal surface (not shown) of the selected virtual tooth 262. That curvature is defined by fossas and pits in an occlusal surface of the patient's molar tooth. The exemplary curvature is therefore concave and that concavity may span a region between the virtual cusps 260. The bite structure 26 may generally conform to this curvature as it may be a beneficial shape for the bite structure 26 in the aligner 10.

Other modifications may occur at 300. For example, the clinician may selectively change the location and/or orientation the outwardly-facing surface 291 of the virtual bite structure 252 from following the natural curvature of the selected virtual tooth 262 (e.g., FIG. 11A) to one designed specifically for modifying the patient's bite in a predetermined way. Exemplary modifications may include forming a flat plane from the curved surface and/or changing an angle of tilt between the virtual bite structure 252 and the tooth 262. These modifications are shown by way of example in FIGS. 11A-11C.

Figure 11B:
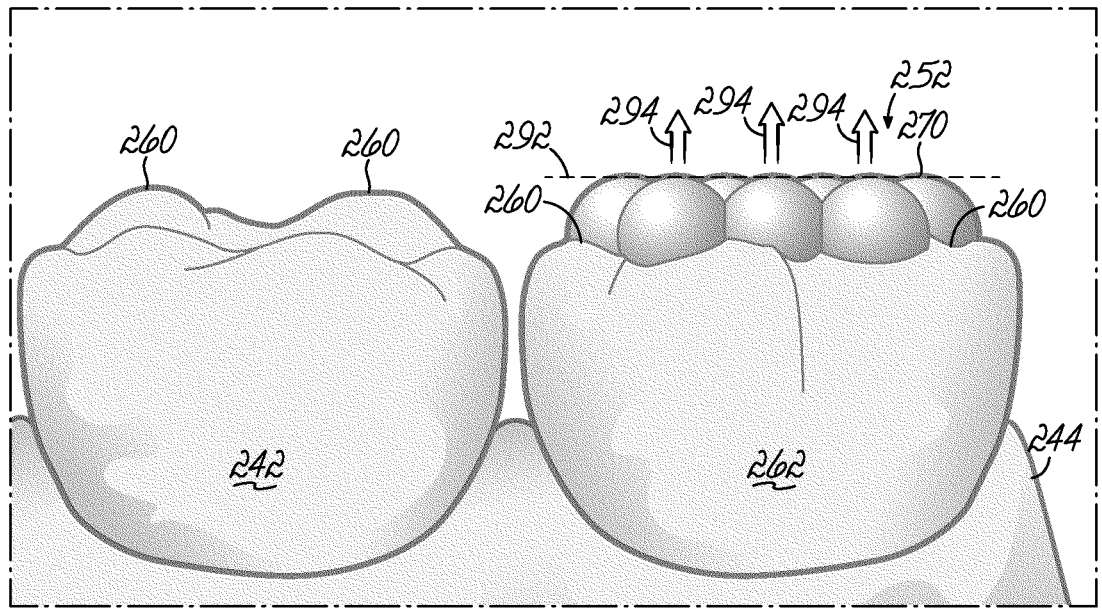
Figure 11C:
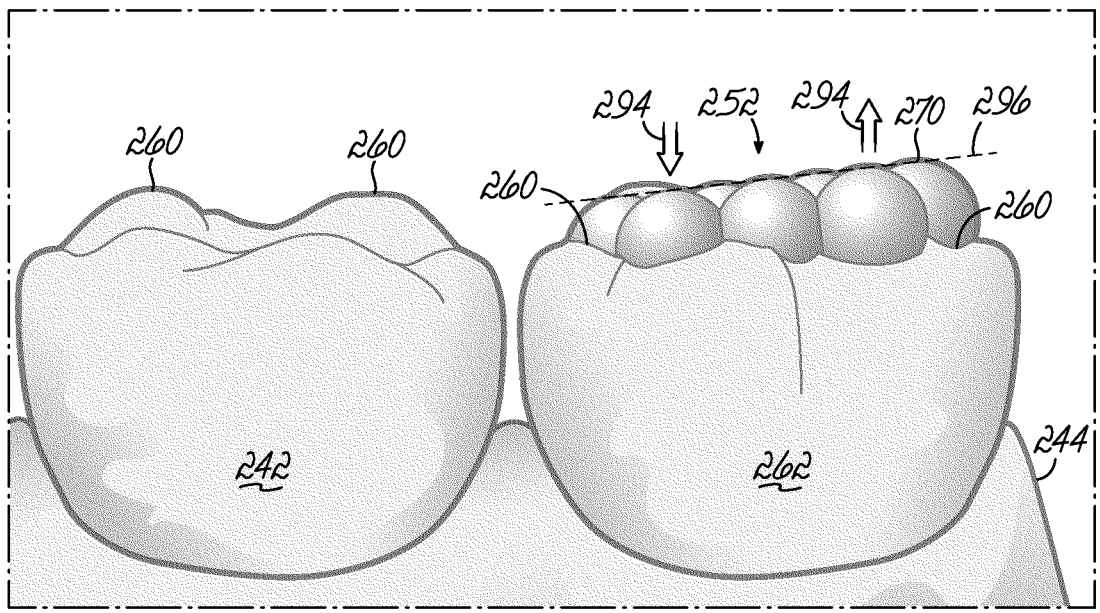

With respect to flattening an occlusal-facing surface, and with reference to FIG. 11B, the clinician may modify the three-dimensional shapes 276 by shifting them so that projections 270 define a predetermined tooth-engagement plane 292. The predetermined plane 292 being positioned to engage an opposing tooth while the aligner 10 is worn. Because the three-dimensional shapes 276 are initially assigned to nodes 280 of the polygons 266, which follow the curvature of the occlusal surface of the virtual tooth 262, the outwardly-facing surface 291 (see FIG. 11A) defined by the three-dimensional shapes 276 may follow that curvature and so may also be concave. By shifting selected ones of the three-dimensional shapes 276 relative to the remaining three-dimensional shapes 276 of the virtual bite structure 252, the outwardly-facing surface 291 is clinician modifiable. This is shown by way of example in FIG. 11B in which selected ones of the three-dimensional shapes 276 may be shifted in an occlusal direction (indicated by arrows 294) by an amount that compensates for the natural curvature in the occlusal surface of the patient's selected molar tooth 262. With that relative occlusal-gingival directional compensation, the plane 292 may be flattened relative to the concave surface 291 (see FIG. 11A), as shown. As an example, the virtual cusps 260 on the virtual molar 262 define a plane (e.g., an occlusal table). The clinician may modify the plane 292 to match the occlusal table, though the plane 292 may be offset in height relative to the occlusal table, as shown in FIG. 11B. While the plane 292 may be modified to be flat, embodiments of the invention are not limited to a flat plane. For example, the plane 292 may be formed so as to be a convex surface with a peak defined in the virtual bite structure 252.

Other modifications may include selecting an angle of engagement between the bite structure 26 and the opposing tooth 54 during orthodontic treatment. The clinician may produce a predetermined shift in the patient's jaws, one relative to the other, when patient closes their jaws by modifying the angle of engagement. As an example, with reference to FIG. 11C, the virtual projections 270 may be arranged to provide a tooth-engaging plane 296 tilted toward the anterior portion of the patient's jaw relative to an occlusal table. Although not shown, the tooth-engaging plane 296 may be tilted toward the posterior portion of the patient's jaw or in another user defined directions. These modifications may change the orientation of the bite engagement between the aligner 10 and opposing tooth 54 as is depicted in FIG. 5 and described above.

Figure 12:
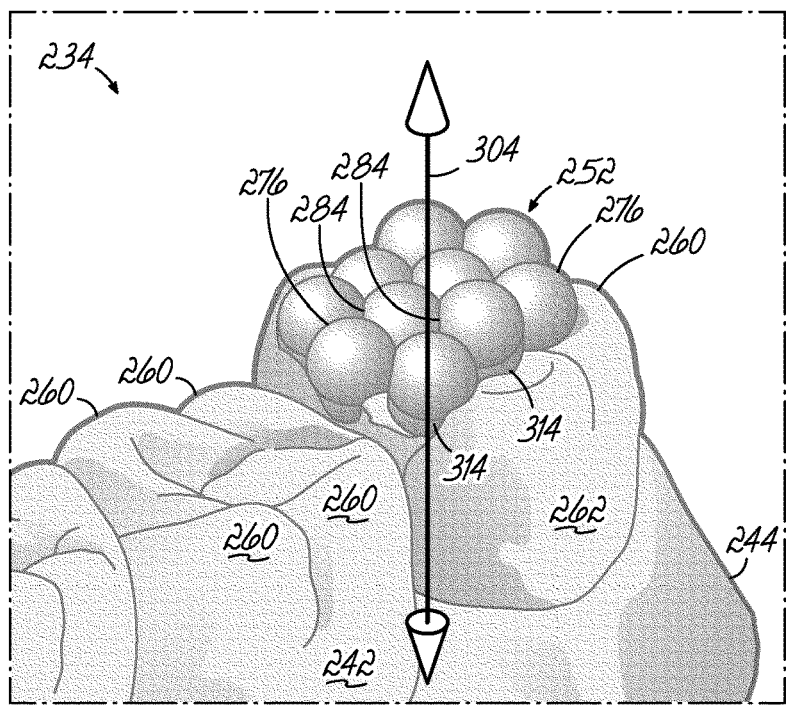
FIG. 12 is a perspective view of the virtual bite structure added to the occlusal region of a virtual tooth model according to one embodiment of the invention.

As yet another modification at 300, the occlusal-gingival height dimension of the virtual bite structure 252 may be modified. As shown in FIG. 12, each of the virtual projections 270 may be shifted in an occlusal-gingival direction, as indicated by arrow 304. In this way, the overall height dimension of the virtual bite structure 252 may be increased or decreased. This modification may be in addition to any single one of the modifications described with reference to FIGS. 11, 11A, 11B, and 11C. In addition, or as an alternative to the occlusal-gingival shift 304, shown in FIG. 12, the virtual bite structure 252 may be shifted in a buccal-lingual direction 316 and/or in a mesial-distal direction 318 shown in FIG. 13. This may allow the clinician to visually adjust the coverage of the virtual bite structure 252 relative to the virtual cusps 260. One or both shifts 316, 318 may be made in a plane parallel to the occlusal table for the selected virtual tooth 262 (i.e., defined by the cusps 260), an occlusal plane of the jaw (not shown), or another clinician defined plane.

At 310 in FIG. 8, boundary conditions to the modification of the virtual bite structure 252 may be imposed. These are generally limited to parameters that permit the mold 200 to be manufactured from the virtual tooth model 234 and to facilitate manufacturing of an aligner 10 from the mold 200. During any modification of the bite structure 252, such as those described with regard to 300 and FIG. 8, the three-dimensional shapes 276 may be moved away from overlap with the selected virtual tooth 262. As that occurs, and depending on the size of the three-dimensional shape 276 and the distance to which any single one of these shapes is moved, the three-dimensional shape 276 may produce a condition that it not amenable to a usable mold and/or a usable aligner. As an example, the three-dimensional shape 276 may separate from the selected virtual tooth 262.

Figure 12A:
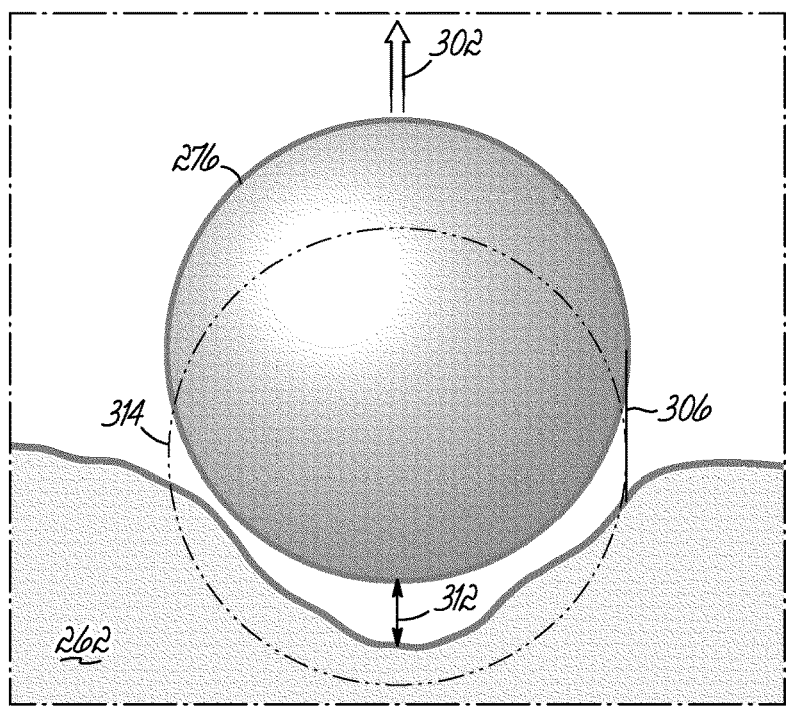
FIG. 12A is a schematic elevation view of FIG. 12 depicting a connecting element according to one embodiment of the invention.

With that consideration and with reference to FIGS. 12 and 12A, the spheres 276 may separate from the tooth 262 as the spheres 276 are moved in the occlusal direction (in FIG. 12A, arrow 302). This movement may be to elevate the bite structure 26 further from the corresponding tooth. This virtual spaced-apart or gapped construction is indicated at arrow 312 in FIG. 12A. This gap 312 creates problems with subsequent formation of the corresponding mold 200. To ensure that the virtual bite structure 252 is moldable, the gap 312 between the sphere 276 and the selected virtual tooth 262 is eliminated.

To that end, at 310, a connecting shape 314 is inserted between the sphere 276 and the selected virtual tooth 262. This is also shown in the enlarged view of FIG. 12A. In one embodiment, the connecting shape 314 is the same three-dimensional shape 276 and is overlapped with the existing three-dimensional shape 276. In this case, the connecting shape 314 is a sphere (shown partly in phantom line in FIG. 12A). The connecting shape 314 ensures that the virtual bite structure 252 is virtually connected to the virtual tooth 262. This connection configuration is mimicked in the mold 200. While separation of the three-dimensional shape 276 is described, other similar conditions occur when the three-dimensional shape 276 remains connected to the tooth 262 although only slightly. In those conditions, the overlap between the three-dimensional shape 276 and the tooth 262 produces a condition that while possible to manufacture in the mold 200, is not usable to manufacture the aligner. For example, where the three-dimensional shape 276 is a sphere, overlap of the sphere with the tooth 262 with more than one-half of the sphere extending out of the virtual tooth 262 may produce a reentrant angle between the sphere 276 and the tooth 262. While the mold 200 may be manufactured with a reentrant angle, an aligner which conforms to that angle may not be separable from the mold 200. To avoid that condition, as with separation, a connecting shape 314 is overlapped between the sphere 276 and the tooth 262. In effect, the connecting shape 314 fills in the reentrancy. Thus, as the virtual bite structure 252 is moved away from the tooth 262, additional, space-filling shapes may be inserted between the virtual bite structure 252 and the tooth 262 to maintain a continuous virtual connection between the bite structure 252 and the tooth 262.

Figure 12B:
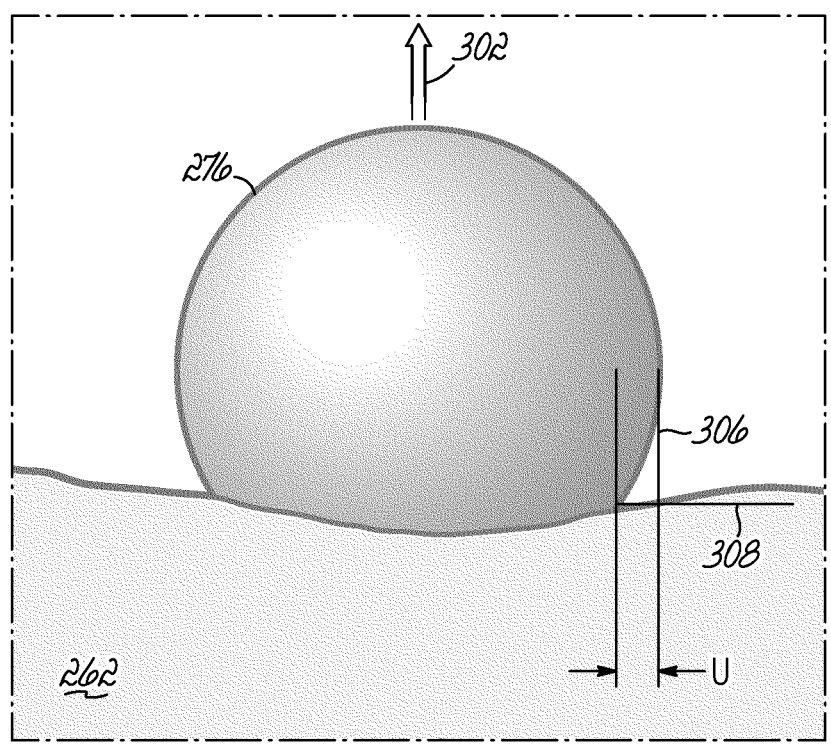
FIG. 12B is a schematic elevation view depicting a measurement of maximum feature dimension for forming an aligner according to one embodiment of the invention.
Figure 13:
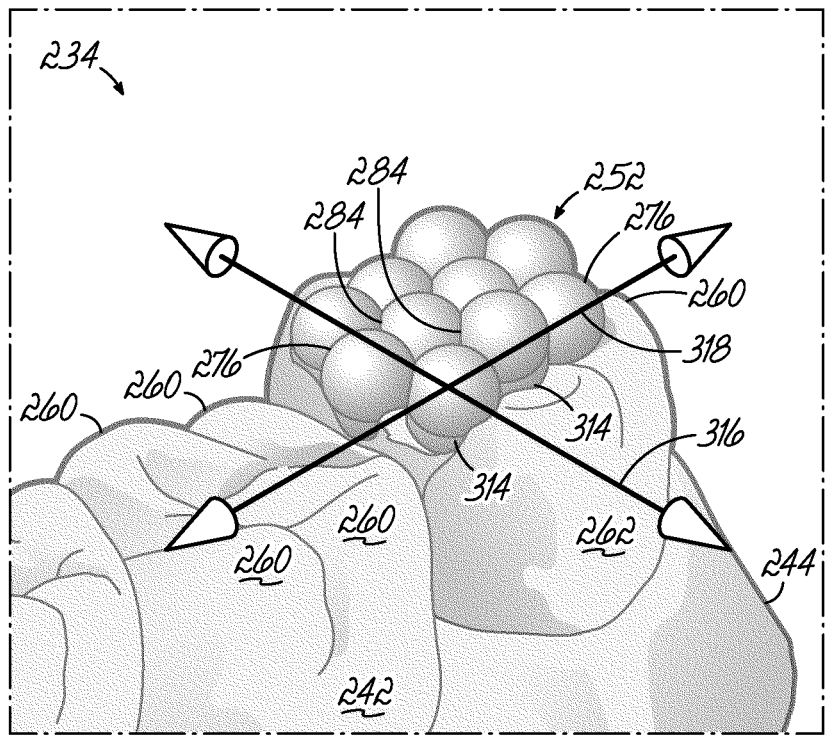
FIG. 13 is a perspective view of the virtual bite structure added to the occlusal region of a virtual tooth model according to one embodiment of the invention.

Avoiding reentrancy in the mold 200 is shown by way of example in FIG. 12A. The connecting shape 314 eliminates the gap 312, but also for the three-dimensional shapes 276 that form the outer perimeter of the bite structure 252, an outer-facing surface 306 (FIG. 12A) does not form a reentrant angle with the selected virtual tooth 262. When the outer-facing surface 306 is reproduced in the mold 200, the workpiece 100 is formed against it. Advantageously, maintaining at least a minimum angle permits molding the workpiece 100 over the mold 200 and then separating the deformed workpiece 100 from the mold 200. As an example only, the angle is not less than about 90 degrees. As an additional example, angles that are less than 90 degrees may also be acceptable depending on the size of the three-dimensional shapes 276 (as reproduced in the mold 200, i.e., molded projections 220) and the thickness of the workpiece 100. It is thought as the size of the three-dimensional shape 276 decreases for a given thickness, any negative effect of reentrancy is reduced simply because the workpiece 100 may not be capable of conforming to such a small feature of the mold 200. From another perspective then, a limit on reentrancy may be defined by the feature size, such as a distance limit, U, shown in FIG. 12B. The distance limit may be defined as a maximum reentrant distance as measured from a tangent 306 to the sphere 276 and a perpendicular line 308 at the surface of the sphere 276 that is greatest distance from the tangent 306. Once the virtual tooth model 234 with virtual bite structure 252 is complete in accordance with the orthodontic treatment plane, the mold 200 having the molded structure 212 that corresponds to the virtual bite structure 252 is manufactured at 320, as set out above. The molded structure 212 is integral to the mold 200.

EXAMPLES

Figure 14:
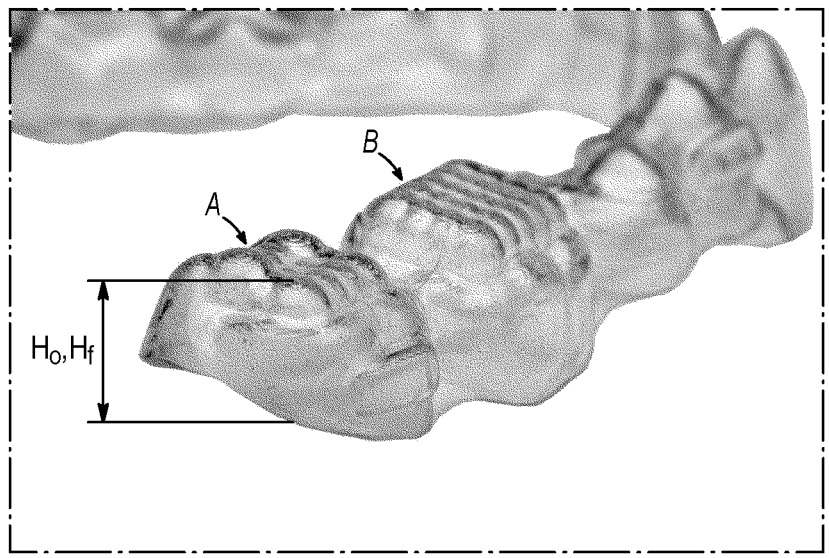
FIG. 14 is an exemplary orthodontic aligner according to an embodiment of the invention.

Eighteen aligners each including a bite structure forming an occlusal portion of a cavity and being configured to fit over a molar tooth were made. Nine were made of Zendura XL (a 0.76 mm thick three-layer polyurethane (inner) polyester (outer) sheet stock) available from Bay Materials, Fremont, CA and nine were made of MP100 (a 0.76 mm thick single-layer copolyester (outer) sheet roll stock) available from Pacur, Oshkosh, WI The aligners were tested for strength and durability. A picture of an aligner similar to the those tested is shown in FIG. 14 in which bite structures are shown as portions of two molar cavities. Each aligner tested included 4 bite structures, 2 on the first molars and 2 on the second molars. The bite structures on the first molars defined a flat tooth-engagement surface (see, e.g., FIG. 14 labeled B), and the bite structures on the second molars defined a concave tooth-engagement surface (see, e.g., FIG. 14 labeled A). Each of the bite structures includes a plurality of dome-shaped projections with adjacent projections spaced apart by boundaries. The bite structure included dome-shaped projections of 1.5 mm in height.

Testing was performed on an Instron® Tester Model 5960 with a 100 N or 500 N Load Cell. Testing fixtures were utilized for each of a strength (i.e., compression) test and a durability (i.e. grinding) test.

Figure 15:
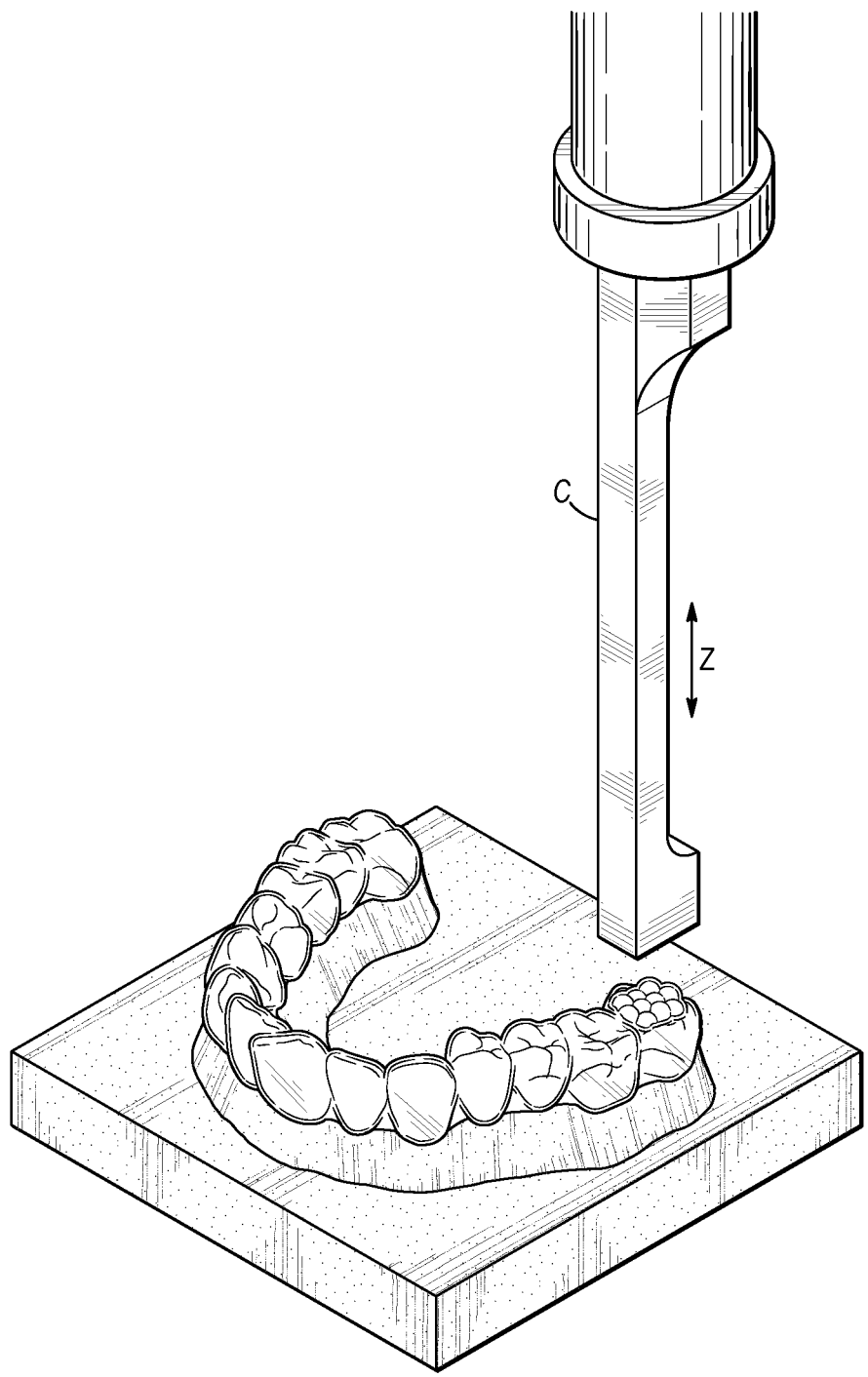
FIG. 15 is a perspective view of a fixture for testing strength of an aligner including a bite structure according to one embodiment of the invention.
Figure 16:
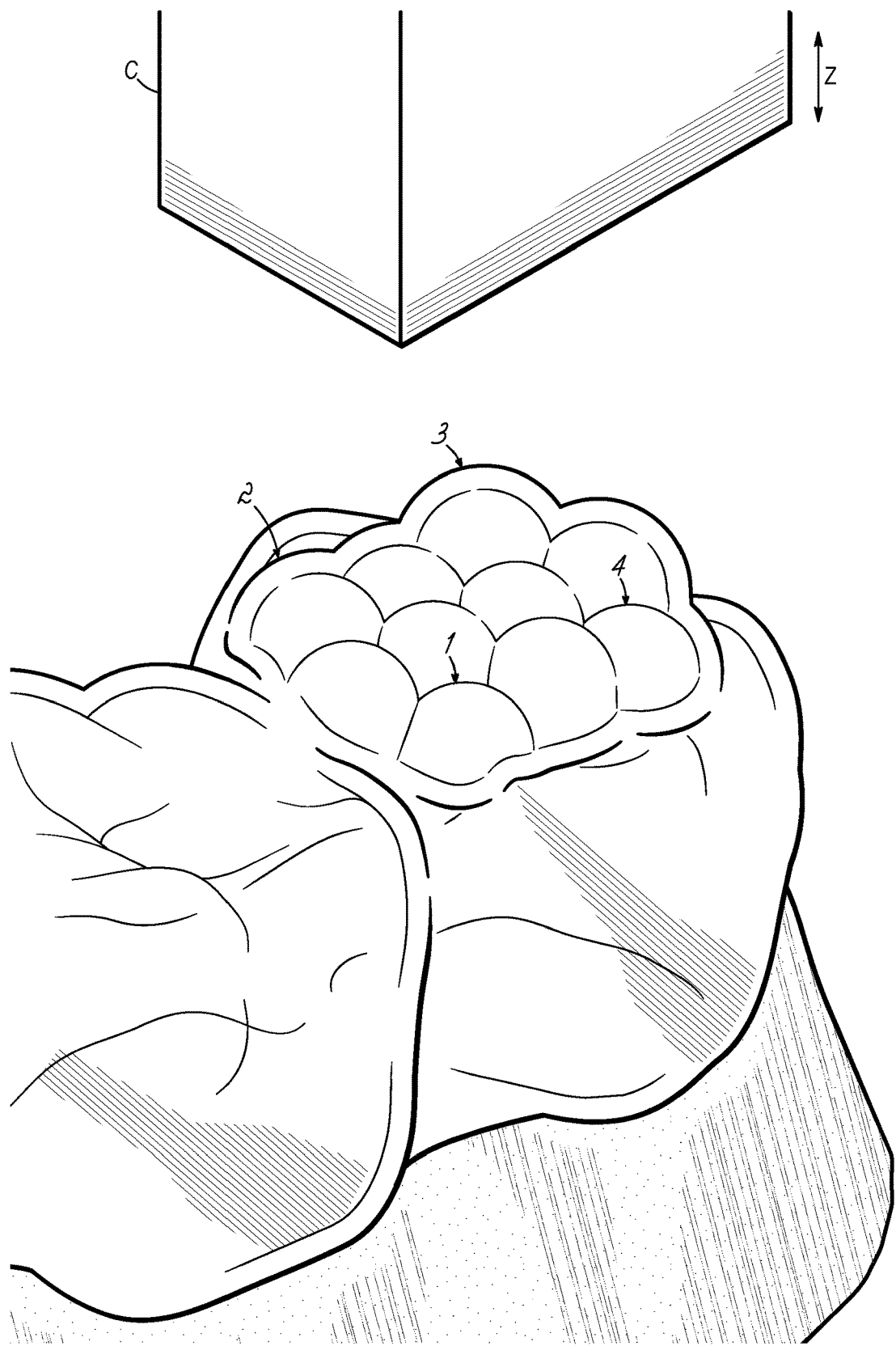
FIG. 16 is an enlarged view of the aligner shown in FIG. 15 illustrating measurement locations.

For the strength/compression test, an attachment fixture to the Instron Tester as is shown in FIG. 15 was utilized. The initial height dimension ($H_o$) of each aligner was measured at four locations with micrometers. Exemplary locations are shown in FIG. 16 and the height dimension $H_o$ is also shown in FIG. 14. The aligner was mounted and clamped on a mold of the patient's teeth. A gap is therefore formed between the mold and the bite structure. The clamped aligner was moved directly below the movable arm (C) in FIG. 16. The movable arm (C) was lowered to touch the bite structure slightly and then adjusted slightly upward to release any contact pressure. This was the start position for testing each aligner.

Figure 17A:
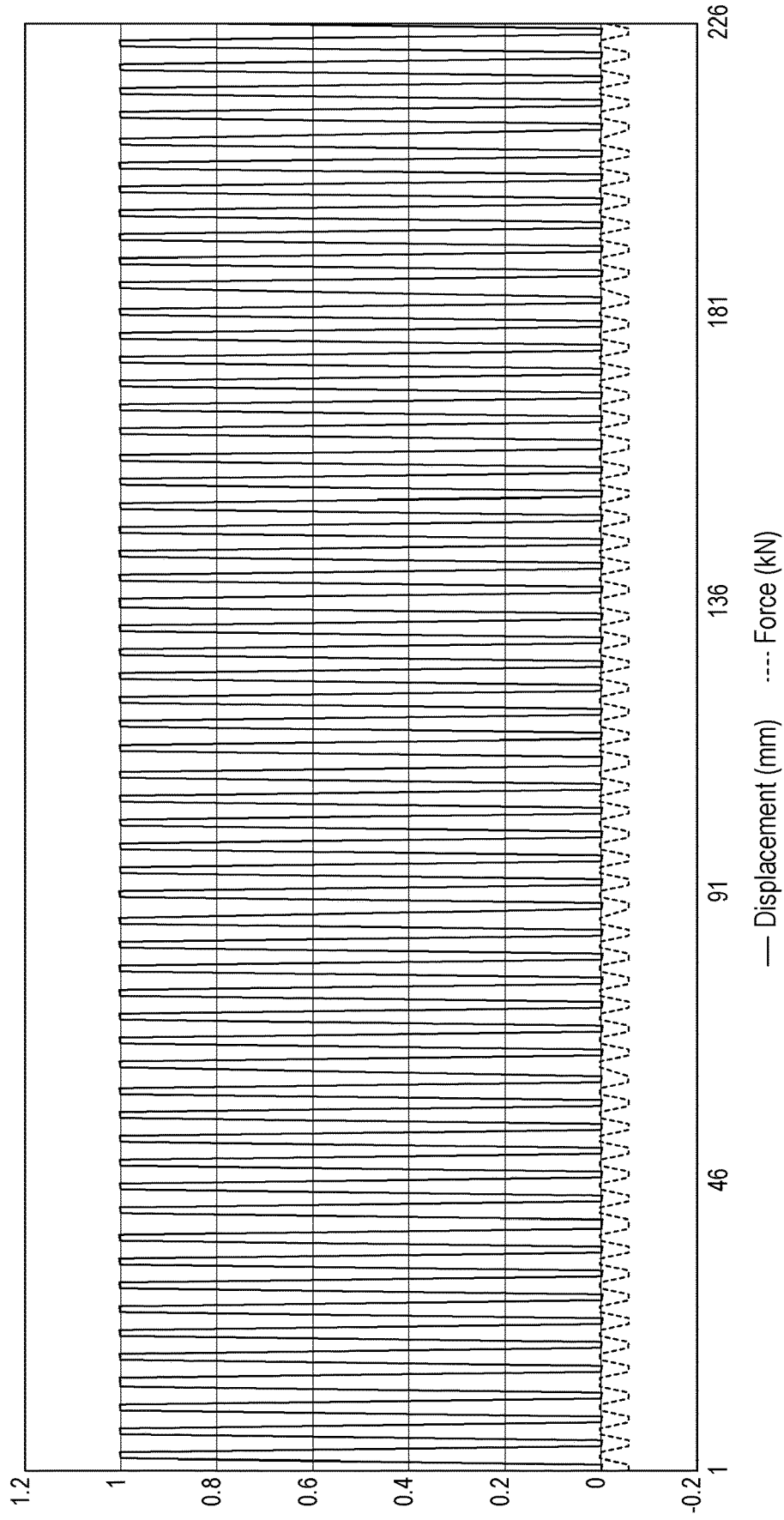
FIG. 17A is a chart of data for the initial 226 cycles on the fixture shown in FIG. 15 from strength testing on an aligner.
Figure 17B:
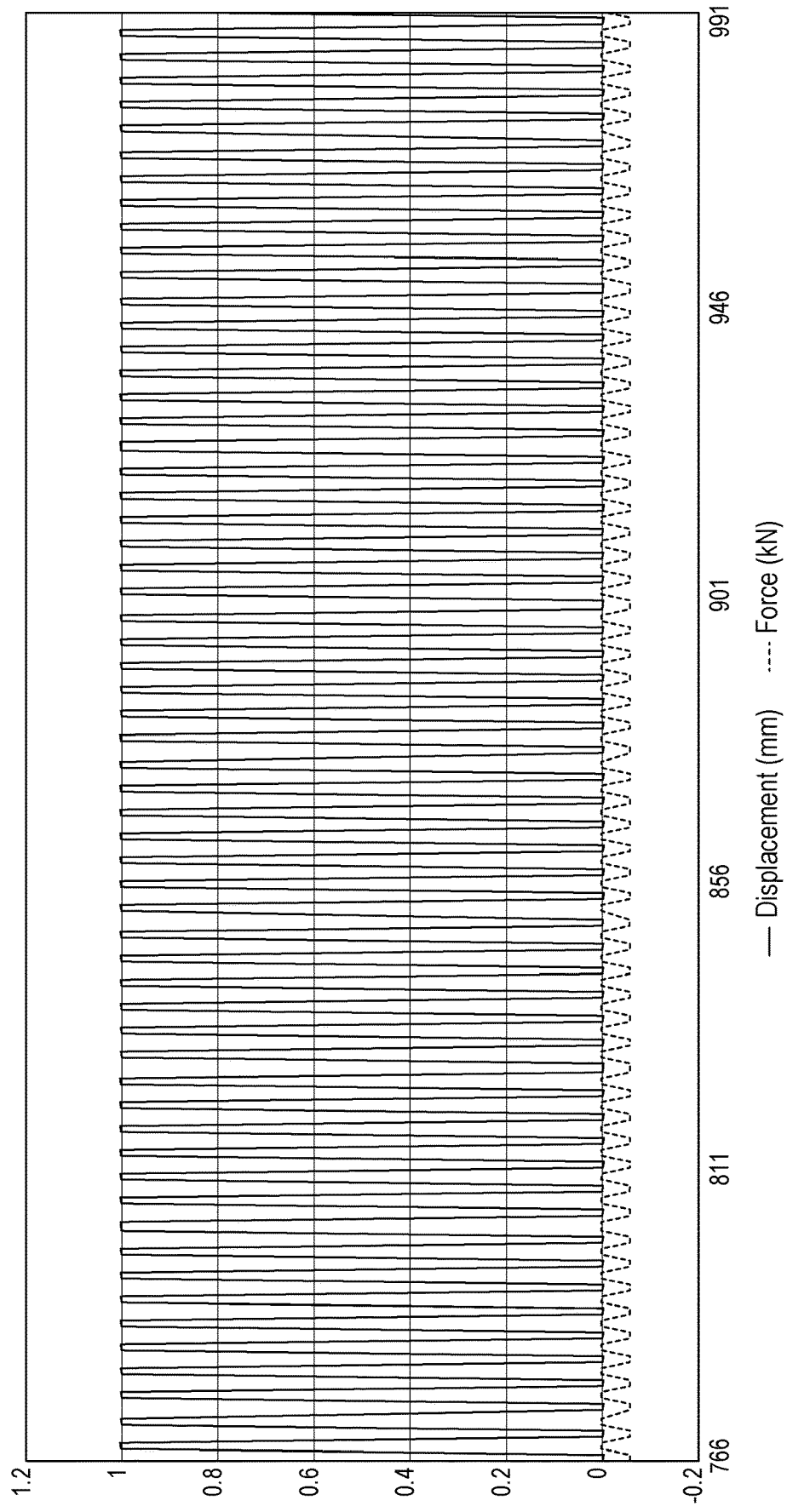
FIG. 17B is a chart of data for the last cycles of the same test for the data of FIG. 17A.

The bite structure was then subject to cyclic loading by oscillating the arm (C) in a Z direction (downward to contact the bite structure and the upward) for ±1 mm range of motion at a rate of 1 mm/s from the start position for 1,000 cycles. Exemplary data from cyclic testing one aligner is shown in FIG. 17. Each aligner was visibly inspected and none of the aligners exhibited any visible cuts or tears as a result of the compression test.

Following testing, each height dimension was remeasured as $H_f$ (FIG. 14). The initial $H_o$ and final $H_f$ dimensions measured were tabulated and are included in FIG. 20A for MP100 and in FIG. 20B for Zendura XL. As indicated generally by the data, for the bite structures for Zendura XL aligners, the maximum average height reduction was 0.22 mm and the minimum average height reduction was 0.00 mm (no change in height). And, for the bite structures for MP100 aligners, the maximum average height reduction was 0.21 mm and the minimum average height reduction was 0.00 mm (no change in height). This indicates that the bite structures substantially resist collapse during simulated bite compression.

Figure 18:
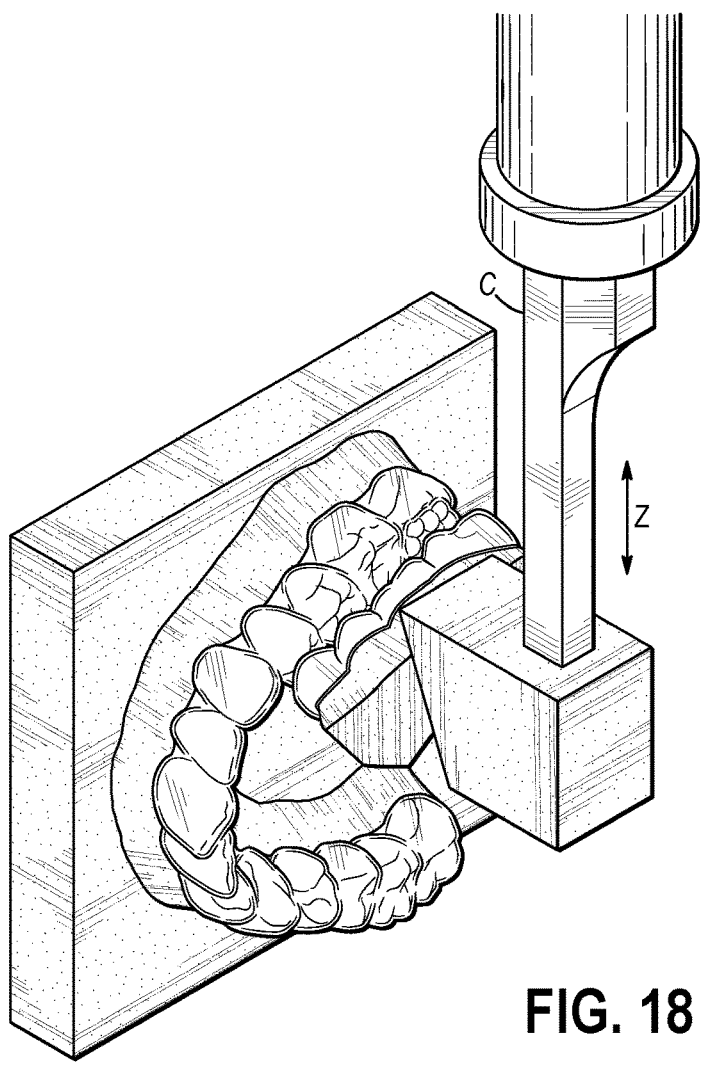
FIG. 18 is a perspective view of a fixture for testing durability of an aligner including a bite structure according to one embodiment of the invention.
Figure 19:
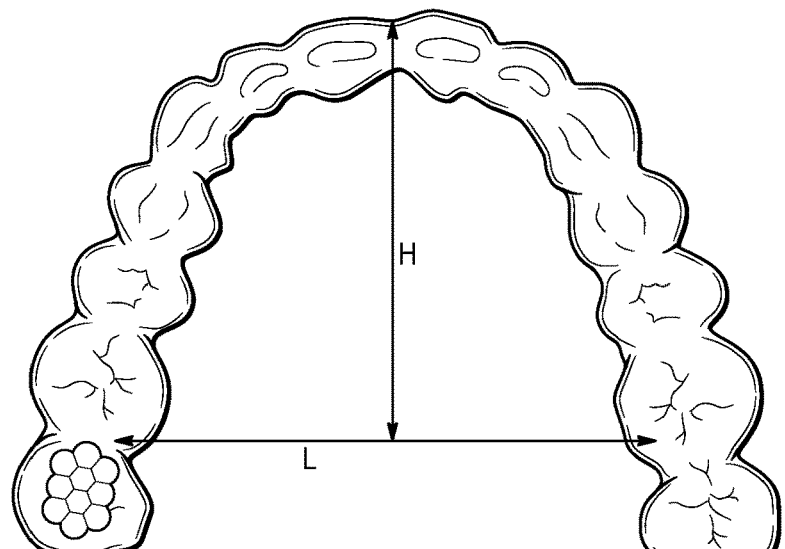
FIG. 19 is a plan view of an aligner depicting measurements for Height and Length for durability testing.

For the durability test, an attachment fixture shown in FIG. 18 was utilized for connection to the Instron Tester. The initial dimensions $H_o$ and $L_o$ on each aligner were measured in accordance with FIG. 19. The $L_o$ dimension is measured between distal lingual cusp tips, and $H_o$ is measured at the midline to the dimension $L_o$, as shown. Each aligner was mounted and clamped as shown in FIG. 18. The mounted aligner was moved toward the movable arm (C) on which another aligner of the same material was positioned. Normal contact between the bite structure on one aligner and an opposing aligner on each of the fixtures was established. Basically, a technician establishes intercuspation consistent with a position of the two opposing molars during natural occlusion. The arm (C) was then oscillated in the Z direction to generate a range of motion at a rate of 10 mm/s from an initial starting position to create a rubbing contacting with the opposing aligner. The minimum range of oscillation was 20 mm. Each cycle of the test consisted of two grinding occurrences, once for upward motion of the arm (C) and one for downward motion of the arm (C). A total of 1,000 cycles was performed (i.e., 2,000 grinding occurrences).

Each aligner was visually inspected and did not exhibit any visible cuts or tears following the durability test. The final dimensions $H_f$ and $L_f$ on each aligner were measured at the same locations. An average of three initial measurements ($H_o$ and $L_o$) and an average of thee final measurements ($H_f$ and $L_f$) are provided in FIGS. 21A and 21B for MP100 aligners and for Zendura XL aligners, respectively. The maximum deformation for the MP100 aligners was 1.54% and the minimum deformation was 0.04%. And, the maximum deformation for the Zendura XL aligners was 1.40% and the minimum deformation was 0.01%. Deformation was calculated based on the differences between the averages of $H_o$, $H_f$ and $L_o$, $L_f$ according to the following equation.

$$\text{Deformation \%} = |((\text{ave. } L_f/\text{ave. } H_f - \text{ave. } L_o/\text{ave. } H_o)/\text{ave. } L_o/\text{ave. } H_o)|*100$$

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. An orthodontic aligner for orthodontic treatment of a patient comprising:
a shell defining at least one cavity sized to receive at least one of the patient's teeth, the at least one cavity including a lingual portion, a labial portion, an occlusal portion, and a bite structure forming at least a portion of the occlusal portion,
wherein the bite structure has a non-planar surface that does not conform to an occlusal surface of the at least one of the patient's teeth,
wherein the non-planar surface has a plurality of projections, including a plurality of outermost projections and at least one additional projection, at least one outermost projection of the plurality of outermost projections forming a portion of a sidewall of the bite structure, the portion of the sidewall being configured to project occlusally from a cusp of the at least one of the patient's teeth, and the at least one additional projection being circumferentially surrounded by the plurality of outermost projections,
wherein at least two outermost projections of the plurality of outermost projections and the at least one additional projection each define a peak, and the peaks collectively define a tooth-engaging surface of the bite structure, and
wherein the tooth-engaging surface is concave and follows a curvature of the occlusal surface of the at least one of the patient's teeth, and when the patient wears the aligner, the bite structure is configured to be spaced apart from the occlusal surface of the at least one of the patient's teeth by a distant sufficient to interfere with full closure of the patient's jaws.

2. The orthodontic aligner of claim 1 wherein the at least two outermost projections are spherical-like projections or ellipsoidal-like projections.

3. The orthodontic aligner of claim 1 wherein the at least two outermost projections are separated by a boundary, and the boundary has a grid-like appearance that spans the bite structure side to side.

4. The orthodontic aligner of claim 1 wherein the bite structure is integral to the shell.

5. The orthodontic aligner of claim 1 wherein each of the lingual portion and the labial portion conform to a lingual surface and a labial surface, respectively, of the at least one patient's tooth.

6. The orthodontic aligner of claim 1 wherein no material extends between the bite structure and tooth surface to support the at least one additional projection of the bite structure when the patient wears the aligner.

7. The orthodontic aligner of claim 1 wherein the bite structure is supported by and sized to span between cusps on the at least one of the patient's teeth.

8. The orthodontic aligner of claim 1 wherein the bite structure is configured to compresses by less than 50% during orthodontic treatment.

9. A series of orthodontic aligners for a patient in which at least one aligner of the series is the orthodontic aligner of claim 1.

10. A method of manufacturing the aligner of claim 1 comprising:
   manufacturing a mold including a plurality of projections corresponding to the patient's teeth and a molded structure forming at least a portion of one of the plurality of projections, the molded structure being configured to form the bite structure.

11. The method of claim 10 further comprising:
   thermoforming a worksheet over the mold to deform the worksheet, wherein, following thermoforming, the deformed worksheet includes the at least one cavity and the bite structure corresponds to the molded structure.

12. The orthodontic aligner of claim 1 wherein the curvature is defined by fossas and pits in the occlusal surface of the patient's molar tooth.

13. The orthodontic aligner of claim 1 wherein the bite structure consists of from 4 to 10 spaced-apart projections of the plurality of projections.

14. A mold useable for manufacturing an orthodontic aligner for a patient, the mold comprising:
   a plurality of projections corresponding to corresponding ones of the patient's teeth, the projections including surfaces corresponding to a lingual surface, a labial surface, and an occlusal surface of a respective tooth, at least one projection of the plurality of projections including a molded structure projecting from a surface corresponding to the occlusal surface of the respective tooth,
   wherein the molded structure has a non-planar surface and does not conform to the respective tooth,
   wherein the non-planar surface has a plurality of molded projections, including a plurality of outermost molded projections and at least one additional molded projection, at least one outermost molded projection of the plurality of outermost molded projections forming a portion of a sidewall of the molded structure, the sidewall projecting occlusally from a location of a cusp of the at least one of the plurality of projections, and the at least one additional molded projection being circumferentially surrounded by the plurality of outermost molded projections,
   wherein at least two outermost molded projections of the plurality of outermost molded projections and the at least one additional molded projection each define a peak, and the peaks collectively define an outwardly-facing surface of the molded structure, and
   wherein the outwardly-facing surface is concave and is configured to follow a curvature of the occlusal surface of the respective tooth.

15. A method of manufacturing an orthodontic aligner comprising:
   identifying a region on an occlusal surface of a virtual tooth model of a patient's tooth having one or more virtual cusps for a virtual bite structure;
   filling at least a portion of the region with a plurality of polygons, the filled portion of the region defining a plurality of nodes;
   assigning a plurality of three-dimensional shapes to at least three of the plurality of nodes including:
      (i) assigning a first three-dimensional shape having at least one virtual projection to a first node of the plurality of nodes, the first three-dimensional shape forming a sidewall of the virtual bite structure, the sidewall projecting occlusally from a location of the one or more virtual cusps;
      (ii) assigning a second three-dimensional shape having at least one virtual projection to a second node of the plurality of nodes; and
      (iii) assigning a third three-dimensional shape having at least one virtual projection to a third node of the plurality of nodes, the third three-dimensional shape being circumferentially surrounded by the plurality of three-dimensional shapes,
   wherein the at least one virtual projection of the first three-dimensional shape, the at least one virtual projection of the second three-dimensional shape, and the at least one virtual projection of the third three-dimensional shape define an outwardly facing surface, and
   wherein the outwardly facing surface is concave and follows a curvature of the occlusal surface of the virtual tooth model.

16. A system for making a virtual bite structure in relation to a virtual model of a patient's teeth, the system comprising:
   a processor; and
   a memory including program code; the processor configured by the program code to:
      fill at least a portion of an identified region on an occlusal surface of a virtual tooth model with a plurality of polygons, the virtual tooth model having one or more virtual cusps and the filled portion of the identified region defining a plurality of nodes;
      assign a plurality of three-dimensional shapes to at least three of the plurality of nodes including:
         (i) assign a first three-dimensional shape having at least one virtual projection to a first node of the plurality of nodes, the first three-dimensional shape forming a sidewall of the virtual bite structure, the sidewall projecting occlusally from a location of the one or more virtual cusps;
         (ii) assign a second three-dimensional shape having at least one virtual projection to a second node of the plurality of nodes; and
         (iii) assign a third three-dimensional shape having at least one virtual projection to a third node of the plurality of nodes, the third three-dimensional shape being circumferentially surrounded by the plurality of three-dimensional shapes,
   wherein the at least one virtual projection of the first three-dimensional shape, the at least one virtual projection of the second three-dimensional shape, and the at least one virtual projection of the third three-dimensional shape define an outwardly facing surface, and
   wherein the outwardly facing surface is concave and follows a curvature of the occlusal surface of the virtual tooth model.

17. An orthodontic aligner for orthodontic treatment of a patient comprising:
   a shell defining at least one cavity sized to receive at least one of the patient's teeth, the at least one cavity including a lingual portion, a labial portion, an occlusal portion, and a bite structure forming at least a portion of the occlusal portion, wherein the bite structure has a non-planar surface that does not conform to an occlusal surface of the at least one of the patient's teeth, wherein the non-planar surface has at least two outermost projections that each form a portion of a sidewall of the bite structure, the sidewall forming an outer boundary of the bite structure in which each portion of the sidewall formed is configured to project occlusally from a cusp of the at least one of the patient's teeth, wherein the non-planar surface has at least one projection that forms no portion of the sidewall and is configured to be positioned occlusally of a fossa of the at least one of the patient's teeth, and wherein the at least two outermost projections and the at least one projection that forms no portion of the sidewall each define a peak, and the peaks collectively define a tooth-engaging surface of the bite structure, with the peak of the at least one projection that forms no portion of the sidewall being configured to be spaced occlusally apart of the fossa of the at least one of the patient's teeth.

18. The orthodontic aligner of claim 17 wherein the tooth-engaging surface is concave and follows a curvature of the occlusal surface of the at least one of the patient's teeth, and when the patient wears the aligner, the bite structure is configured to be spaced apart from the occlusal surface of the at least one of the patient's teeth by a distant sufficient to interfere with full closure of the patient's jaws.

\* \* \* \* \*